(12) United States Patent
Sinyavskiy et al.

(10) Patent No.: US 9,256,215 B2
(45) Date of Patent: Feb. 9, 2016

(54) APPARATUS AND METHODS FOR GENERALIZED STATE-DEPENDENT LEARNING IN SPIKING NEURON NETWORKS

(75) Inventors: Oleg Sinyavskiy, San Diego, CA (US); Filip Ponulak, San Diego, CA (US)

(73) Assignee: BRAIN CORPORATION, San Diego, CA (US)

( * ) Notice: Subject to any disclaimer, the term of this patent is extended or adjusted under 35 U.S.C. 154(b) by 543 days.

(21) Appl. No.: 13/560,902

(22) Filed: Jul. 27, 2012

(65) Prior Publication Data

US 2014/0032459 A1    Jan. 30, 2014

(51) Int. Cl.
*G06N 5/00* (2006.01)
*G06F 1/00* (2006.01)
*G05B 13/02* (2006.01)
*G06N 3/04* (2006.01)

(52) U.S. Cl.
CPC .............. *G05B 13/025* (2013.01); *G06N 3/049* (2013.01)

(58) Field of Classification Search
USPC ........................................................ 706/16
See application file for complete search history.

(56) References Cited

U.S. PATENT DOCUMENTS

| | | | |
|---|---|---|---|
| 5,063,603 A | 11/1991 | Burt | |
| 5,092,343 A | 3/1992 | Spitzer | |
| 5,245,672 A | 9/1993 | Wilson | |
| 5,355,435 A | 10/1994 | DeYong | |
| 5,388,186 A | 2/1995 | Bose | |
| 5,408,588 A | 4/1995 | Ulug | |
| 5,467,428 A | 11/1995 | Ulug | |
| 5,638,359 A | 6/1997 | Peltola | |
| 5,673,367 A | 9/1997 | Buckley | |
| 5,875,108 A | 2/1999 | Hoffberg | |
| 6,009,418 A | 12/1999 | Cooper | |
| 6,014,653 A | 1/2000 | Thaler | |

(Continued)

FOREIGN PATENT DOCUMENTS

| | | |
|---|---|---|
| CN | 102226740 | 10/2011 |
| EP | 1089436 | 4/2001 |

(Continued)

OTHER PUBLICATIONS

Hagras, Hani et al., "Evolving Spiking Neural Network Controllers for Autonomous Robots", IEEE 2004, all pages.

(Continued)

*Primary Examiner* — Jeffrey A Gaffin
*Assistant Examiner* — Kalpana Bharadwaj
(74) *Attorney, Agent, or Firm* — Gazdzinski & Associates, PC

(57) ABSTRACT

Generalized state-dependent learning framework in artificial neuron networks may be implemented. A framework may be used to describe plasticity updates of neuron connections based on connection state term and neuron state term. The state connections within the network may be updated based on inputs and outputs to/from neurons. The input connections of a neuron may be updated using connection traces comprising a time-history of inputs provided via the connections. Weights of the connections may be updated and connection state may be time varying. The updated weights may be determined using a rate of change of the trace and a term comprising a product of a per-neuron contribution and a per-connection contribution configured to account for the state time-dependency. Using event-dependent connection change components, connection updates may be executed on per neuron basis, as opposed to per-connection basis.

25 Claims, 15 Drawing Sheets

(56) References Cited

U.S. PATENT DOCUMENTS

| | | |
|---|---|---|
| 6,363,369 B1 | 3/2002 | Liaw |
| 6,458,157 B1 | 10/2002 | Suaning |
| 6,545,705 B1 | 4/2003 | Sigel |
| 6,545,708 B1 | 4/2003 | Tamayama |
| 6,546,291 B2 | 4/2003 | Merfeld |
| 6,581,046 B1 | 6/2003 | Ahissar |
| 6,601,049 B1 | 7/2003 | Cooper |
| 6,643,627 B2 | 11/2003 | Liaw et al. |
| 7,395,251 B2 | 7/2008 | Linsker |
| 7,426,501 B2 | 9/2008 | Nugent |
| 7,672,920 B2 | 3/2010 | Ito |
| 7,849,030 B2 | 12/2010 | Ellingsworth |
| 8,015,130 B2 | 9/2011 | Matsugu |
| 8,103,602 B2 | 1/2012 | Izhikevich |
| 8,315,305 B2 | 11/2012 | Petre |
| 8,467,623 B2 | 6/2013 | Izhikevich |
| 8,655,815 B2 * | 2/2014 | Palmer et al. .............. 706/26 |
| 2002/0038294 A1 | 3/2002 | Matsugu |
| 2003/0050903 A1 | 3/2003 | Liaw |
| 2004/0193670 A1 | 9/2004 | Langan |
| 2005/0015351 A1 | 1/2005 | Nugent |
| 2005/0036649 A1 | 2/2005 | Yokono |
| 2005/0283450 A1 | 12/2005 | Matsugu |
| 2006/0161218 A1 | 7/2006 | Danilov |
| 2007/0022068 A1 | 1/2007 | Linsker |
| 2007/0176643 A1 | 8/2007 | Nugent |
| 2007/0208678 A1 | 9/2007 | Matsugu |
| 2008/0024345 A1 | 1/2008 | Watson |
| 2008/0162391 A1 * | 7/2008 | Izhikevich .............. 706/25 |
| 2009/0043722 A1 | 2/2009 | Nugent |
| 2009/0287624 A1 | 11/2009 | Rouat |
| 2010/0086171 A1 | 4/2010 | Lapstun |
| 2010/0166320 A1 | 7/2010 | Paquier |
| 2010/0198765 A1 | 8/2010 | Fiorillo |
| 2011/0016071 A1 | 1/2011 | Guillen |
| 2011/0119214 A1 | 5/2011 | Breitwisch |
| 2011/0119215 A1 | 5/2011 | Elmegreen |
| 2011/0160741 A1 | 6/2011 | Asano |
| 2012/0011090 A1 | 1/2012 | Tang |
| 2012/0011093 A1 | 1/2012 | Aparin |
| 2012/0036099 A1 | 2/2012 | Venkatraman |
| 2012/0109866 A1 | 5/2012 | Modha |
| 2012/0303091 A1 | 11/2012 | Izhikevich |
| 2012/0308076 A1 | 12/2012 | Piekniewski |
| 2012/0308136 A1 | 12/2012 | Izhikevich |
| 2013/0073080 A1 | 3/2013 | Ponulak |
| 2013/0073491 A1 | 3/2013 | Izhikevich |
| 2013/0073493 A1 * | 3/2013 | Modha .............. 706/25 |
| 2013/0073496 A1 | 3/2013 | Szatmary |
| 2013/0073500 A1 | 3/2013 | Szatmary |
| 2013/0151448 A1 | 6/2013 | Ponulak |
| 2013/0151449 A1 | 6/2013 | Ponulak |
| 2013/0151450 A1 | 6/2013 | Ponulak |
| 2013/0204820 A1 | 8/2013 | Hunzinger |
| 2013/0218821 A1 | 8/2013 | Szatmary |
| 2013/0251278 A1 | 9/2013 | Izhikevich |
| 2013/0297541 A1 | 11/2013 | Piekniewski |
| 2013/0325766 A1 | 12/2013 | Petre |
| 2013/0325768 A1 | 12/2013 | Sinyavskiy |
| 2013/0325773 A1 | 12/2013 | Sinyavskiy |
| 2013/0325774 A1 | 12/2013 | Sinyavskiy |
| 2013/0325775 A1 | 12/2013 | Sinyavskiy |
| 2013/0325776 A1 | 12/2013 | Ponulak |
| 2013/0325777 A1 | 12/2013 | Petre |
| 2014/0016858 A1 | 1/2014 | Richert |
| 2014/0025613 A1 | 1/2014 | Ponulak |
| 2014/0032458 A1 | 1/2014 | Sinyavskiy |
| 2014/0193066 A1 | 7/2014 | Richert |

FOREIGN PATENT DOCUMENTS

| | | |
|---|---|---|
| JP | 4087423 | 3/1992 |
| RU | 2108612 | 10/1998 |
| RU | 2406105 | 10/2010 |
| WO | 2008132066 | 6/2008 |
| WO | 2008083335 | 7/2008 |

OTHER PUBLICATIONS

Masakazu et al, "Convolutional Spiking Neural Network Model for Robust Face Detection", 2002 Proceedings of the 9th International Conference on Neural Information Processing (ICONIP'02), vol. 2, all pages.

Jesper Tegner, et al., 2002 "An adaptive spike-timing-dependent plasticity rule" Elsevier Science B.V, all pages.

Seung, H. "Learning in spiking neural networks by reinforcement of stochastic synaptic transmission." Neuron vol. 40 No. 6 (2003): pp. 1063-1073.

Weber, C. et al. 'Robot docking with neural vision and reinforcement.' Knowledge-Based Systems vol. 17 No. 2 (2004): pp. 165-172.

Baras, D. et al. "Reinforcement learning, spike-time-dependent plasticity, and the BCM rule." Neural Computation vol. 19 No. 8 (2007): pp. 2245-2279.

de Queiroz, M. et al. "Reinforcement learning of a simple control task using the spike response model." Neurocomputing vol. 70 No. 1 (2006): pp. 14-20.

PCT International Search Report and Written Opinion for International Application No. PCT/US2013/044124 dated Sep. 12, 2013.

Bennett (1999), The early history of the synapse: from Plato to Sherrington. Brain Res. Bull., 50(2): 95-118.

Haykin, (1999), Neural Networks: A Comprehensive Foundation (Second Edition), Prentice-Hall, all pages.

"In search of the artificial retina" [online], Vision Systems Design, Apr. 1, 2007, all pages.

Kenji, (2000), Reinforcement Learning in Continuous Time and Space, Neural Computation, 12:1, 219-245.

Klute et al., (2002). Artificial Muscles: Actuators for Biorobotic Systems. The International Journal 0./ Robotics Research 21 :295-309.

Lendek et al., (2006) State Estimation under Uncertainty: A Survey. Technical report 06-004, Delft Center for Systems and Control Delft University of Technology, all pages.

Legenstein et al., (2008), A learning theory for reward-modulated spike timing-dependent plasticity with application to biofeedback. PLoS Computational Biology, 4(10): 1-27.

Nikolic et al., (2011) High-sensitivity silicon retina for robotics and prosthetics, all pages.

Ponulak, (2005), ReSuMe—New supervised learning method for Spiking Neural Networks. Technical Report, Institute of Control and Information Engineering, Poznan University of Technology, all pages.

Ponulak et al., (2010) Supervised Learning Sipiking Neural Networks with ReSuMe: Sequence Learning, Classification and Spike-Shifting. Neural Comp., 22(2): 467-510.

Sutton et al., (1998), Reinforcement Learning, an Introduction. MIT Press, all pages.

Schreiber et al., (2003), A new correlation-based measure of spike timing reliability. Neurocomputing, 52-54, 925-931.

Sutton, (1988). Learning to predict by the methods of temporal differences. Machine Learning 3(1), 9-44.

Stein, (1967). Some models of neural variability. Biophys. J., 7: 37-66, all pages.

Werbos, (1992), or Prokhorov D.V and Wunsch D.C. (1997) Adaptive Critic Designs, IEEE Trans Neural Networks, vol. 8, No. 5, pp. 997-1007.

White et al., (Eds.) (1992) Handbook of Intelligent Control: Neural, Fuzzy and Adaptive Approaches. Van Nostrand Reinhold, New York, all pages.

Widrow et al., (1960) Adaptive Switching Circuits. IRE WESCON Convention Record 4: 96-104.

Ponulak (2006) Supervised Learning in Spiking Neural Networks with ReSuMe Method. Doctoral Dissertation Poznan, Poland, all pages.

Florian (2007) Reinforcement Learning Through Modulation of Spike-Timing-Dependent Synaptic Plasticity, Neural Computation 19, 1468-1502 Massachusetts Institute of Technology.

(56) References Cited

OTHER PUBLICATIONS

Morrison, (2008)Phenomenological models of synaptic plasticity based on spike timing, Received: Jan. 16, 2008 / Accepted: Apr. 9, 2008 The Author(s), all pages.

Bouganis et al., (2010) "Training a Spiking Neural Network to Control a 4-DoF Robotic Arm based on Spike Timing-Dependent Plasticity", Proceedings of WCCI201 0 IEEE World Congress on Computational Intelligence, CCIB, Barcelona, Spain, Jul. 18-23, 2010, pp. 4104-4111.

Xie et al., (2004) "Learning in neural networks by reinforcement of irregular spiking", Physical Review E, vol. 69, letter 041909, pp. 1-10.

Floreano et al., (2008) Floreano et al. Neuroevolution: From Architectures to learning Evol. Intel. Jan. 2008 1:47-62 (retrieved online on Apr. 24, 2013 from http://infoscience.epfl.ch/record/112676/files/FloreanoDuerrMattiussi2008pdf).

D'Cruz (1998) Reinforcement Learning in Intelligent Control: A Biologically-Inspired Approach to the Re/earning Problem Brendan May 1998, all pages.

Aleksandrov (1968), Stochastic optimization, Engineering Cybernetics, 5, 11-16.

Amari (1998), Why natural gradient?, Acoustics, Speech and Signal Processing, (pp. 1213-1216). Seattle, WA, USA.

Bartlett et al., (2000) "A Biologically Plausible and Locally Optimal Learning Algorithm for Spiking Neurons" Retrieved from http://arp.anu.edu.au/ftp/papers/jon/brains.pdf.gz, all pages.

Baxter et al. (2000.). Direct gradient-based reinforcement learning. In Proceedings of the International Symposium on Circuits, all pages.

Bohte et al., "A Computational Theory of Spike-Timing Dependent Plasticity: Achieving Robust Neural Responses via Conditional Entropy Minimization" 2004, all pages.

Bohte, (2000). SpikeProp: backpropagation for networks of spiking neurons. In Proceedings of ESANN'2000, (pp. 419-424).

Booij (2005, 6). A Gradient Descent Rule for Spiking Neurons Emitting Multiple Spikes. Information Processing Letters No. 6, v.95, 552--558.

Breiman et al., "Random Forests" 33pgs, Jan. 2001.

Capel, "Random Forests and Ferns" LPAC, Jan. 11, 2012, 40 pgs.

El-Laithy (2011), A reinforcement learning framework for spiking networks with dynamic synapses, Comput Intell Neurosci, all pages.

Fletcher (1987), Practical methods of optimization, New York, NY: Wiley-Interscience, all pages.

Florian (2005), A reinforcement learning algorithm for spiking neural networks SYNASC '05 Proceedings of the Seventh International Symposium on Symbolic and Numeric Algorithms for Scientific Computing, all pages.

Fremaux et al., "Functional Requirements for Reward-Modulated Spike-Timing-Dependent Plasticity", The Journal of Neuroscience, Oct. 6, 2010, 30 (40):13326-13337.

Fu (2005) Stochastic Gradient Estimation, Technical Research Report, all pages.

Fu (2008), What You Should Know About Simulation and Derivatives Naval Research Logistics, vol. 55, No. 8, 723-736.

Fyfe et al., (2007), Reinforcement Learning Reward Functions for Unsupervised Learning, ISNN '07 Proceedings of the 4th international symposium on Neural Networks: Advances in Neural Networks, all pages.

Gerstner (2002), Spiking neuron models: single neurons, populations, plasticity, Cambridge, U.K.: Cambridge University Press, all pages.

Glynn (1995), Likelihood ratio gradient estimation for regenerative stochastic recursions, Advances in Applied Probability, 27, 4, 1019-1053.

Ho, "Random Decision Forests" Int'l Conf. Document Analysis and Recognition, 1995, 5 pgs.

Izhikevich (2007), Solving the distal reward problem through linkage of STDP and dopamine signaling, Cerebral Cortex, vol. 17, pp. 2443-2452.

Kalal et al. "Online learning of robust object detectors during unstable tracking" published on 3rd On-line Learning for Computer Vision Workshop 2009, Kyoto, Japan, IEEE CS, all pages.

Kiefer (1952), Stochastic Estimation of the Maximum of a Regression Function, Annals of Mathematical Statistics 23, #3, 462-466.

Klampfl (2009), Spiking neurons can learn to solve information bottleneck problems and extract independent components, Neural Computation, 21(4), pp. 911-959.

Kleijnen et al., Optimization and sensitivity analysis of computer simulation models by the score function method Invited Review European Journal of Operational Research, Mar. 1995.

LaRochelle et al., (2009), Exploring Strategies for Training Deep Neural Networks, J. of Machine Learning Research, v. 10, pp. 1-40.

Ozuysal et al., "Fast Keypoint Recognition in Ten Lines of Code" CVPR 2007, 11 pages.

Ozuysal et al., "Fast Keypoint Recognition Using Random Ferns" IEEE Transactions on Pattern Analysis and Machine Intelligence, vol. 32, No. 3, Mar. 2010, pp. 448-461.

Pfister (2003), Optimal Hebbian Learning: A Probabilistic Point of View, In ICANN Proceedings. Springer, pp. 92-98.

Pfister (2006), Optimal Spike-Timing Dependent Plasticity for Precise Action Potential Firing in Supervised Learning, Neural computation ISSN 0899-7667, 18(6), all pages.

Reiman et al. (1989). Sensitivity analysis for simulations via likelihood ratios. Oper Res 37, 830-844.

Robbins (1951), A Stochastic Approximation Method, Annals of Mathematical Statistics 22, #3, 400-407.

Rosenstein et al., (2002), Supervised learning combined with an actor-critic architecture, Technical Report 02-41, Department of Computer Science, University of Massachusetts, Amherst, all pages.

Kleijnen et al., "Optimization and sensitivity anaiysis of computer simulation models by the score function method", Invited Review European Journal of Operational Research, Mar. 1995, all pages.

Rumelhart et al., (1986), Learning representations by back-propagating errors, Nature 323 (6088), pp. 533-536.

Rumelhart (1986), Learning internal representations by error propagation, Parallel distributed processing, vol. 1 (pp. 318-362), Cambridge, MA: MIT Press.

Sinyavskiy, et al. "Generalized Stochatic Spiking Neuron Model and Extended Spike Response Model in Spatial-Temporal Impulse Pattern Detection Task", Optical Memory and Neural Networks (Information Optics), 2010, vol. 19, No. 4, pp. 300-309, 2010.

Tishby et al., (1999), The information bottleneck method, In Proceedings of the 37th Annual Allerton Conference on Communication, Control and Computing, B Hajek & RS Sreenivas, eds., pp. 368-377, University of Illinois.

Toyoizumi (2007), Optimality Model of Unsupervised Spike-Timing Dependent Plasticity: Synaptic Memory and Weight Distribution, Neural Computation, 19 (3), all pages.

Toyoizumi et al., (2005), Generalized Bienenstock-Cooper-Munro rule for spiking neurons that maximizes information transmission, Proc. Natl. Acad. Sci. USA, 102, (pp. 5239-5244).

Vasilaki et al., "Spike-Based Reinforcement Learning in Continuous State and Action Space: When Policy Gradient Methods Fail" PLoS, vol. 5, Issue 12, Dec. 2009, all pages.

Vasilaki, et al., "Learning flexible sensori-motor mappings in a complex network" Biol Cybern (2009) 100:147-158.

Weaver (2001), The Optimal Reward Baseline for Gradient-Based Reinforcement Learning, UAI 01 Proceedings of the 17th Conference in Uncertainty in Artificial Intelligence (pp. 538-545). Morgan Kaufman Publishers.

Weber et al., (2009), Goal-Directed Feature Learning, In: Proc, International Joint Conference on Neural Networks, 3319-3326.

Williams (1992), Simple Statistical Gradient-Following Algorithms for Connectionist Reinforcement Learning, Machine Learning 8, 229-256.

Yi (2009), Stochastic search using the natural gradient, ICML '09 Proceedings of the 26th Annual International Conference on Machine Learning. New York, NY, USA, all pages.

Sherrington, (1897); The Central Nervous System. A Textbook of Physiology, 7th ed., part III, Ed. by Foster M. Macmillian and Co. Ltd., London, p. 929.

(56) References Cited

OTHER PUBLICATIONS

Alexandros Bouganis and Murray Shanahan, "Training a Spiking Neural Network to Control a 4-DoF Robotic Arm based on Spike Timing-Dependent Plasticity", Proceedings of WCCI201 0 IEEE World Congress on Computational Intelligence, CCIB, Barcelona, Spain, Jul. 18-23, 2010, pp. 4104-4111.

Gerstner (2002), Spiking neuron models: single neurons, populations, plasticity, Cambridge, U.K.: Cambridge University Press.

Izhikevich, E. (2007), *Solving the Distal Reward Problem through Linkage of STDP and Dopamine Signaling*, Cerebral Cortex, 17, 2443-2452.

Ojala et al., "Performance Evaluation of Texture Measures with Classification Based on Kullback Discrimination of Distributions" 1994 IEEE, pp. 582-585.

Sinyavskiy O. Yu.: 'Obuchenic s podkrepleniem spaikovoy neiroiniy seti v zadache upravleniya agentom v diskretnoy virtualnoy srede.' Nelineinaya Dinamika vol. T. 7., No. 24, 2011, pp. 859-875.

Schrauwen et al., "Improving SpikeProp: Enhancements to an Error—Backpropagation Rule for Spiking Neural Networks", ProsRISC workshop, 2004, pp. 301-305.

Ponulak, "Analysis of the Resume learning Process for Spiking Neural Networks," International Journal of Applied Mathematics & Computer Science: Jun. 2008, vol. 18, Issue 2, pp. 117-127.

Masquelier et al., "Unsupervised learning of visual features through spike timing dependent plasticity", PLoS Computational Biology 3.2 (2007): e31, pp. 0247-0257.

PCT International Search Report for International Application PCT/US2013/060352 dated Jan. 16, 2014.

Bohte, "Spiking Nueral Networks" Doctorate at the University of Leiden, Holland, Mar. 5, 2003, pp. 1-133 [retrieved on Nov. 14, 2012]. Retrieved from the internet: <URL:http://homepages.cwi.nl/-sbohte/publication/phdthesis.pdf>.

Brette et al., Brian: a simple and flexible simulator for spiking neural networks, The Neuromorphic Engineer, Jul. 1, 2009, pp. 1-4, doi: 10.2417/1200906.1659.

Cuntz et al., "One Rule to Grow Them All: A General Theory of Neuronal Branching and Its Paractical Application" PLOS Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Fidjeland et al., Accelerated Simulation of Spiking Neural Networks Using GPUs [online], 2010 [retrieved on Jun. 15, 2013], Retrieved from the Internet: URL:http://ieeexplore.ieee.org/xpls/abs_all.jsp?arnumber=5596678&tag=1.

Floreano et al., "Neuroevolution: from architectures to learning" Evol. Intel. Jan. 2008 1:47-62, [retrieved Dec. 30, 2013] [retrieved online from URL:<http://inforscience.epfl.ch/record/112676/files/FloreanoDuerrMattiussi2008.pdf>.

Gewaltig et al., NEST (Neural Simulation Tool), Scholarpedia, 2007, pp. 1-15, 2(4):1430, doi: 1 0.4249/scholarpedia.1430.

Gleeson et al., ) NeuroML: A Language for Describing Data Driven Models of Neurons and Networks with a High Degree of Biological Detail, PLoS Computational Biology, Jun. 2010, pp. 1-19 vol. 6 Issue 6.

Goodman et al., Brian: a simulator for spiking neural networks in Python, Frontiers in Neuroinformatics, Nov. 2008, pp. 1-10, vol. 2, Article 5.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conf.fninf.2011.08.00098.

Graham, Lyle J., The Surf-Hippo Reference Manual, http://www.neurophys.biomedicale.univparis5. fr/-graham/surf-hippo-files/Surf-Hippo%20Reference%20Manual.pdf, Mar. 2002, pp. 1-128.

Izhikevich, "Polychronization: Computation with Spikes", Neural Computation, 25, 2006, 18, 245-282.

Izhikevich, "Simple Model of Spiking Neurons", IEEE Transactions on Neural Networks, vol. 14, No. 6, Nov. 2003, pp. 1569-1572.

Izhikevich, "Relating STDP to BCM", Neural Computation 15, 1511-1523 (2003).

Karbowski et al., "Multispikes and Synchronization in a Large Neural Network with Temporal Delays", Neural Computation 12, 1573-1606 (2000).

Khotanzad, "Classification of invariant image representations using a neural network" IEEF. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf>.

Laurent, "The Neural Network Query Language (NNQL) Reference" [retrieved on Nov. 12, 2013]. Retrieved from the Internet: URL:http://nnql.org/nnql.org.

Laurent, "Issue 1—nnql—Refactor Nucleus into its own file—Neural Network Query Language" [retrieved on Nov. 12, 2013]. Retrieved from the Internet: URL:https://code.google.com/p/nnql/issues/detail?id=1.

Nichols, A Reconfigurable Computing Architecture for Implementing Artificial Neural Networks on FPGA, Master's Thesis, The University of Guelph, 2003, pp. 1-235.

Pavlidis et al. Spiking neural network training using evolutionary algorithms. In: Proceedings 2005 IEEE International Joint Conference on Neural Networks, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoc/download?doi=10.1.1.5.4346&rep=rep1&type=pdf.

Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].

Schemmel et al., Implementing synaptic plasticity in a VLSI spiking neural network model in Proceedings of the 2006 International Joint Conference on Neural Networks (IJCNN'06), IEEE Press (2006) Jul. 16-21, 2006, pp. 1-6 [online], [retrieved on Dec. 10, 2013]. Retrieved from the Internet <URL: http://www.kip.uni-heidelberg.de/veroeffentlichungen/download.cgi/4620/ps/1774.pdf>.

Simulink® model [online], [Retrieved on Dec. 10, 2013] Retrieved from <URL: http://www.mathworks.com/products/simulink/index.html>.

Sinyavskiy et al. "Reinforcement learning of a spiking neural network in the task of control of an agent in a virtual discrete environment" Rus. J. Nonlin. Dyn., 2011, vol. 7, No. 4 (Mobile Robots), pp. 859-875, chapters 1-8 (Russian Article with English Abstract).

Sjostrom J., W. Gerstner. Spike-Timing Dependent Plasticity. Scholarpedia, [Online], 2010, 5(2), 1362.

Szatmary et al., "Spike-timing Theory of Working Memory" PLoS Computational Biology, vol. 6, Issue 8, Aug. 19, 2010 [retrieved on Dec. 30, 2013]. Retrieved from the Internet: <URL: http://www.ploscompbiol.org/article/info%3Adoi%2F10.1371%2Fjournal.pcbi.10008 79#>.

PCT International Search Report for PCT/US2013/052136 dated Nov. 30, 2013.

Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org>.

* cited by examiner

```
1.  DEFINE UNIT StochasticSRMNeuron
2.  {
3.  INIT
4.  {
5.  //Neuron state variable (v - voltage)
6.  float v = 0;
7.  float x1 = 0;

8.  //Stochastic part
9.  float lambda = 0;
10.     float Lambda_big = 0;
11.     float randgen = 0;
12.     float I = 0;
13.     int spiked = 0;
14.     float Q = 0;

15.     //Precalculated eligibility traces
16.     float syn_x[] = {0,0,0,...}; //30 zeros (T = 30 here)
17.     float syn_st[] = {0,0,0,...};
18.     float syn_e[] = {0,0,0,...};
19.     }

20.     UPDATE_RULE
21.     {
22.     CODE
23.     {
24.     //Update voltage
25.     v += -v*Consts.MembraneConstant +
   x1*Consts.MembraneConstant*2.71828183;
26.     x1 += -x1*Consts.MembraneConstant + I;
27.     I = 0;

28.     spiked = 0;

29.     //Probabilistic threshold calculations
30.     lambda = Consts.lambda0*Math.Exp((v -
   Consts.Threshold)*Consts.stochasticK);
31.     if (lambda < 0.2)
32.     Lambda_big = lambda;
33.     else
34.     Lambda_big = 1. - Math.Exp(-lambda);

35.     randgen = Sys.Rand(32,-31);
36.     if (randgen < Lambda_big)
37.     spiked = 1;

38.     //Reset voltage
```

FIG. 8A

```
39.     if (spiked)
40.     v = 0;
41.     if (spiked)
42.     x1 = 0;

43.     //Calculate state-dependent term Q(t) for eligibility
   traces
44.     Q = lambda*Consts.stochasticK;

45.     if (spiked)
46.     //TODO: implement with tables
47.     if (lambda<0.2)
48.     Q += (-Consts.stochasticK);
49.     else
50.     Q += (-Consts.stochasticK)*lambda/Lambda_big;

51.     // code added per neuron that implements LUTs
52.     for(int i = n-1; i >0; --i)
53.     {
54.     syn_x[i]  = syn_x[i-1] -syn_x[i-1]*membraneConstant;
55.     syn_st[i] = syn_st[i-1] -syn_st[i-1]*membraneConstant
   + syn_x[i-1]*membraneConstant*2.71828183;
56.     syn_e[i]  = entropyDecayCoeff*syn_e[i-1] +
   stateDerivative*syn_st[i-1]*entropyAntiDecayTau;
57.     }

58.     syn_x[0]  = 1;
59.     syn_st[0] = 0;
60.     syn_e[0] = syn_st[0]*stateDerivative;

61.     //Reset synapse state traces if there was an output
   spike
62.     if (spiked){
63.     for(int i = n-1; i >=0; --i)
64.     {
65.     syn_x[i]  = 0;
66.     syn_st[i] = 0;
67.     }
68.     }
69.     }
70.     }

71.     EVENT_RULE
72.     {
73.     EXEC_CONDITION ( spiked)
74.     CODE {
75.     }
```

FIG. 8B

```
76.    }
77.    }
78.    DEFINE SYNAPSE SRMStochasticSynapse
79.    {
80.    INIT
81.    {
82.    float w = Consts.initialW;

83.    int t_last_0 = -10000;
84.    int t_last_1 = -10000;
85.    int t_last_2 = -10000;
86.    int t_last_3 = -10000;
87.    }

88.    //Synapse doesn't have UPDATE_RULE that is executed
       every time step - only event-based rules 89.    PRESYNAPTIC_EVENT_RULE
90.    {
91.    Unit.I += w;
92.    //Detect input spike times
93.    t_last_3 = t_last_2;
94.    t_last_2 = t_last_1;
95.    t_last_1 = t_last_0;
96.    t_last_0 = Sys.Now;
97.    }
98.    POSTSYNAPTIC_EVENT_RULE
99.    {
100.   float e = 0;
101.   //Access to look-up table in the neuron
102.   if (Sys.Now - t_last_0 < n)
103.   e += Unit.syn_e(Sys.Now - t_last_0);

104.   if (Sys.Now - t_last_1 < n)
105.   e += Unit.syn_e(Sys.Now - t_last_1);

106.   if (Sys.Now - t_last_2 < n)
107.   e += Unit.syn_e(Sys.Now - t_last_2);

108.   if (Sys.Now - t_last_3 < n)
109.   e += Unit.syn_e(Sys.Now - t_last_3);

110.   w -= Unit.total_reward*e;
111.   }
112.   }
```

FIG. 8C

APPARATUS AND METHODS FOR GENERALIZED STATE-DEPENDENT LEARNING IN SPIKING NEURON NETWORKS

CROSS-REFERENCE TO RELATED APPLICATIONS

This application is related to a co-owned and co-pending U.S. patent application Ser. No. 13/487,533, entitled "STOCHASTIC SPIKING NETWORK LEARNING APPARATUS AND METHODS" filed Jun. 4, 2012, U.S. patent application Ser. No. 13/489,280 entitled "APPARATUS AND METHODS FOR REINFORCEMENT LEARNING IN ARTIFICIAL NEURAL NETWORKS", filed Jun. 5, 2012, "U.S. patent application Ser. No. 13/487,499 entitled "STOCHASTIC APPARATUS AND METHODS FOR IMPLEMENTING GENERALIZED LEARNING RULES", filed Jun. 4, 2012, U.S. patent application Ser. No. 13/560,891 entitled "APPARATUS AND METHODS FOR EFFICIENT UPDATES IN SPIKING NEURON NETWORKS", filed Jul. 27, 2012, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Disclosure

The present disclosure relates to implementing learning in spiking neuron networks.

2. Description of Related Art

Spiking Neural Networks

Artificial spiking neural networks are frequently used to gain an understanding of biological neural networks, and for solving artificial intelligence problems. These networks typically employ a pulse-coded mechanism, which encodes information using timing of the pulses. Such pulses (also referred to as "spikes" or 'impulses') are short-lasting (typically on the order of 1-2 ms) discrete temporal events. Several exemplary embodiments of such encoding are described in a commonly owned and co-pending U.S. patent application Ser. No. 13/152,084 entitled APPARATUS AND METHODS FOR PULSE-CODE INVARIANT OBJECT RECOGNITION", filed Jun. 2, 2011, [client reference BRAIN.001A] and U.S. patent application Ser. No. 13/152,119, Jun. 2, 2011, entitled "SENSORY INPUT PROCESSING APPARATUS AND METHODS", [client reference BRAIN.003A] each incorporated herein by reference in its entirety.

A typical artificial spiking neural network, such as the network 100 shown for example in FIG. 1, may comprise a plurality of units (or nodes) 102, which correspond to neurons in a biological neural network. Any given unit 102 may receive input via connections 104, also referred to as communications channels, or synaptic connections. Any given unit 102 may be connected to other units via connections 112, also referred to as communications channels, or synaptic connections. The units (e.g., the units 106 in FIG. 1) providing inputs to any given unit via for example connections 104, are commonly referred to as the pre-synaptic units, while the unit receiving the inputs (e.g., the units 102 in FIG. 1) is referred to as the post-synaptic unit. Furthermore, the post-synaptic unit of one unit layer (e.g. the units 102 in FIG. 1) can act as the pre-synaptic unit for the subsequent upper layer of units (not shown).

Individual ones of the connections (104, 112 in FIG. 1) may be assigned, inter alia, a connection efficacy (which in general refers to a magnitude and/or probability of influence of pre-synaptic spike to firing of post-synaptic neuron, and may comprise, for example a parameter: synaptic weight, by which one or more state variables of post synaptic unit are changed). During operation of the pulse-code network (e.g., the network 100), synaptic weights may be typically adjusted using what is referred to as the spike-timing dependent plasticity (STDP) in order to implement, among other things, network learning.

One such adaptation mechanism is illustrated with respect to FIGS. 2-3. Traces 200, 210 in FIG. 2 depict pre-synaptic input spike train (delivered for example via connection 104_1 in FIG. 1) and post synaptic output spike train (generated, for example, by the neuron 102_1 in FIG. 1), respectively.

Properties of the connections 104 (such as weights w) may be adjusted based on relative timing between the pre-synaptic input (e.g., the pulses 202, 204, 206, 208 in FIG. 2) and post-synaptic output pulses (e.g., the pulses 214, 216, 218 in FIG. 2). One typical STDP weight adaptation rule is illustrated in FIG. 3, where rule 300 depicts synaptic weight change $\Delta w$ as a function of time difference between the time of post-synaptic output generation and arrival of pre-synaptic input $\Delta t = t_{post} - t_{pre}$. In some implementations, synaptic connections (e.g., the connections 104 in FIG. 1) delivering pre-synaptic input prior to the generation of post-synaptic response are potentiated (as indicated by $\Delta w > 0$ associated with the curve 302), while synaptic connections (e.g., the connections 104 in FIG. 1) delivering pre-synaptic input subsequent to the generation of post-synaptic response are depressed (as indicated by $\Delta w < 0$ associated with the curve 304 in FIG. 3). By way of illustration, when the post-synaptic pulse 208 in FIG. 2 is generated: (i) connection associated with the pre-synaptic input 214 may precede the output pulse (indicated by the line denoted 224) and it may be potentiated ($\Delta w > 0$ in FIG. 3 and the weight is increased); and (ii) connections associated with the pre-synaptic input 216, 218 that follow may be depressed ($\Delta w < 0$ in FIG. 3 and the weights are decreased).

Spiking Neuron Models

Generalized dynamics equations for spiking neurons models may be expressed as a superposition of input, interaction between the input current and the neuronal state variables, and neuron reset after the spike as follows:

$$\frac{d\vec{q}}{dt} = V(\vec{q}) + \sum_{t^{out}} R(\vec{q})\delta(t - t^{out}) + G(\vec{q})I^{ext} \quad \text{(Eqn. 1)}$$

where:

$\vec{q}$ is a vector of internal state variables (e.g., comprising membrane voltage);

$I^{est}$ is external input into neuron;

V is the function that defines evolution of the state variables;

G describes the interaction between the input current and the state variables (for example, to model postsynaptic potentials); and R describes resetting the state variables after the output spikes at $t^{out}$.

For example, for IF model the state vector and the state model may be expressed as:

$$\vec{q}(t) \equiv u(t); V(\vec{q}) = -Cu; R(\vec{q}) = u_{res}; G(\vec{q}) = 1, \quad \text{(Eqn. 2)}$$

where C is a membrane constant, $u_{res}$ is a value to which voltage is set after output spike (reset value). Accordingly, Eqn. 1 may become:

$$\frac{du}{dt} = -Cu + \sum_{t^{out}} (u_{refr} - u)\delta(t - t^{out}) + I^{ext} \quad \text{(Eqn. 3)}$$

For a simple neuron model, Eqn. 1 may be expressed as:

$$\frac{dv}{dt} = 0.04v^2 + 5v + 140 - u + \sum_{t^{out}} (c - v)\delta(t - t^{out}) + I^{ext} \quad \text{(Eqn. 4)}$$

$$\frac{du}{dt} = -a(bv - u) + d\sum_{t^{out}} \delta(t - t^{out})$$

where:

$$\vec{q}(t) \equiv \begin{pmatrix} v(t) \\ u(t) \end{pmatrix}; \quad \text{(Eqn. 5)}$$

$$V(\vec{q}) = \begin{pmatrix} 0.04v^2(t) + 5v(t) + 140 - u(t) \\ a(bv(t) - u(t)) \end{pmatrix};$$

$$R(\vec{q}) = \begin{pmatrix} c - v(t) \\ d \end{pmatrix};$$

$$G(\vec{q}) = \begin{pmatrix} 1 \\ 0 \end{pmatrix}$$

and a,b,c,d are parameters of the model.

Some algorithms for spike-time learning (especially, reinforcement learning) in spiking neural networks may be represented using the following general equation described, for example, in co-pending and co-owned U.S. patent application Ser. No. 13/487,499 entitled "STOCHASTIC APPARATUS AND METHODS FOR IMPLEMENTING GENERALIZED LEARNING RULES", incorporated supra:

$$\frac{d\theta_i(t)}{dt} = \eta F(t) e_i(t) \quad \text{(Eqn. 6)}$$

where:
- $\theta_i(t)$ is an adaptation (learning) parameter of a synaptic connection between the pre-synaptic neuron i and the post-synaptic neuron j;
- $\eta$ is a parameter referred to as the learning rate, $\eta$ can be a constant parameter or it can be a function of some other system parameters;
- F(t) is a performance function; and
- $e_i(t)$ is eligibility trace, configured to characterize relations between pre-synaptic and post-synaptic activity.

An exemplary eligibility trace may comprise a temporary record of the occurrence of an event, such as visiting of a state or the taking of an action, or a receipt of pre-synaptic input. The trace marks the parameters associated with the event (e.g., the synaptic connection, pre- and post-synaptic neuron IDs) as eligible for undergoing learning changes. In one approach, when a reward signal occurs, only eligible states or actions may be 'assigned credit' or 'blamed' for the error. Thus, the eligibility traces aid in bridging the gap between the events and the training information.

Various implementations of eligibility traces exist for different types of learning (e.g., supervised, unsupervised, reinforcement) for deterministic and stochastic neurons. However, existing implementations do not appear to provide a common framework thereby requiring reformulating, learning rules (e.g., for determining the eligibility traces) for each implementation.

Accordingly, there is a salient need for a more efficient method and apparatus for implementing state-dependent learning comprising in spiking neural network comprising a generalized (canonic) form of eligibility traces that may allow common implementation of the updates.

SUMMARY

The present disclosure satisfies the foregoing needs by facilitating, inter alia, implementing generalized probabilistic learning configured to handle simultaneously various learning rule combinations.

One aspect of the disclosure relates to a system, apparatus, method, and/or computer-readable storage medium associated with implementing an update for a computerized spiking neuron capable of producing an outcome consistent with (i) an input spiking signal, and (ii) a learning task. The system may comprise one or more processors configured to execute computer program modules. Executing the computer program modules may cause the one or more processors to determine a present value of an eligibility trace. The eligibility trace may comprise a time history of one or more spikes of the input spiking signal. The time history may include information associated with individual ones of the one or more spikes occurring at a time period prior to the present time. Executing the computer program modules may cause the one or more processors to determine a rate of change of the eligibility trace at the present time based on one or both of (i) the present value of the eligibility trace or (ii) a product of a neuron portion and connection portion. Executing the computer program modules may cause the one or more processors to effectuate the update based on the rate of change of the eligibility trace. The neuron portion may be characterized by a present neuron state. The update may be configured to transition the present neuron state towards a target state. The target state may be associated with producing the outcome.

In some implementations, the input spike signal may be provided to the neuron via a plurality of connections. The connection portion may be configured to characterize a state of individual ones of the plurality of connections independently from one another. The neuron portion may be configured to characterize the neuron state for individual ones of the plurality of connections substantially simultaneously to one another.

In some implementations, individual ones of the plurality of connections may be characterized by individual ones of a plurality of synaptic weights. The update may comprise modifying individual ones of the plurality of synaptic weights based on updated eligibility trace.

In some implementations, the updated eligibility trace may be determined via an integration of the rate of change with respect to time.

In some implementations, the adjustment of individual ones of the weights may be determined based on a product of the rate of change and an additional signal. The additional signal may be time dependent and configured to affect individual ones of the plurality of connections. The rate of change for at least one of the weights may be configured to be determined independently from other of the weights.

In some implementations, the additional signal may comprise a reinforcement signal conveying information associated with at least one reinforcement spike. The reinforcement signal may be configured based on the present neuron state and the target state.

In some implementations, the update may be based on an event being one or more of: (i) generation of the outcome comprising at least on spike; (ii) occurrence of the one or more spikes; (iii) a timer event indicative of an expiration of current update time period; or (iv) the at least one reinforcement spike.

In some implementations, the reinforcement signal may be configured based on a distance measure between the neuron output and a target output. The target output may be associated with the target state.

In some implementations, the distance measure may include one or more of: (i) mean squared error, (ii) weighed error; or (iii) squared error of the convolved signals the reward signal is configured based on a distance measure between the present neuron state and the target state.

In some implementations, the reinforcement signal may be configured to provide one or both of: (1) a positive reward when a distance measure between the current state and the desired state is smaller compared to the distance measure between the prior state and the desired state or (2) a negative reward when the distance measure between the current state and the desired state is greater compared to the distance measure between the prior state and the desired state.

In some implementations, the additional signal may comprise one or both of (1) a performance measure determined based on a present performance associated with the present state, or (2) a target performance associated with the target state. The present performance may be based on a present value of the learning parameter.

In some implementations, the outcome may be characterized by a spike-free time period subsequent occurrence of the least one reinforcement spike.

In some implementations, the reinforcement signal may comprise a negative reward determined based on the present performance being outside a predetermined measure from the target performance.

In some implementations, the state parameter may be configured to characterize time evolution of the neuron state. The realization of the trace may comprise an analytic solution of the time derivative representation. The construct of the time derivative representation may facilitate attaining the integration via symbolic integration operation.

In some implementations, the neuron may be configured to operate in accordance with a dynamic process configured to be updated at time intervals. The time period may comprise a plurality of the time intervals.

In some implementations, the update may comprise a synaptic update of first and second connections capable of providing the spiking input. The connection portion may comprise a first part configured to characterize the first connection and a second part configured to characterize the second connection. The synaptic update may comprise a connection weight update of the first and the second connections. The weight update may be configured based on the eligibility trace.

In some implementations, the weight update may be configured based on a product of the eligibility trace and a reinforcement signal comprising at least one reinforcement spike. The reinforcement signal may be configured based on the present neuron state and the target state.

In some implementations, the spiking input may be provided during a stimulus interval. The synaptic update may comprise a plasticity rule configured to modify a magnitude of the first connection weight and the second connection weight. The modifying of the magnitude may have a time window associated therewith. The plasticity rule may be configured to adjust one or both of: (1) a start point of the window or (2) an end point of the window.

In some implementations, the spiking input may be provided during an stimulus interval. The synaptic update may comprise a plasticity rule configured to modify magnitude of the first and connection weight and the second connection weight. The plasticity rule may be characterized by a portion having a time scale configured substantially comparable to the stimulus interval.

In some implementations, the plasticity rule may be characterized by another portion configured to exceed the stimulus interval by at least 10 times.

In some implementations, the outcome may comprise at least one spike generated by the neuron based on the input spiking signal.

Another aspect of the disclosure relates to a system, apparatus, method, and/or computer-readable storage medium associated with learning in a computerized spiking neuron. The method may include operating the neuron in accordance with a learning process configured to be updated at one or more time intervals. The update may include retrieving prior values of first and second traces associated, respectively, with first and second connections that are capable of providing spiking input into the neuron. The update may include determining a rate of change of: (i) the first trace based on (1) the prior value of the first trace and (2) a product of a neuron portion and a first connection portion; and (ii) the second trace based on (1) the prior value of the second trace and (2) a product of the neuron portion and second connection portion. The update may include determining an updated value of the first and second traces based on the respective rate of change. The prior values of the first and the second traces may be associated with another update preceding the update. The first connection portion and the second connection portion may be based on one or more spikes of the spiking input being provided, respectively, via the first and the second connections. The one or more spikes may occur within a time interval between the other update and the update. The learning process may be configured to cause the neuron to generate an output in accordance with the spiking input. The output may be characterized by a performance measure configured such that the update is capable of reducing the measure.

Yet another aspect of the disclosure relates to a system, apparatus, method, and/or computer-readable storage medium associated with operating a plurality of data interfaces in a computerized network comprising at least a node. The method may include storing a time record of one or more data items capable of being provided to the node via the plurality of data interfaces. The time history may include information associated with individual ones of the one or more spikes occurring at an interval prior to the present time. The method may include determining a value of a plurality of eligibility traces, based on the time record. The method may include determining a rate of change of a respective trace of the plurality of eligibility traces, based on one or both of: (i) the present value of the plurality of eligibility traces or (ii) a product of a node component and a plurality of interface components. The method may include effectuating the update based on the rate of change.

In some implementations, the respective trace of the plurality of eligibility traces may be associated with a respective interface of the plurality of interfaces. Individual ones of the plurality of interface components may be configured to characterize the respective trace. The node component may be configured based on a node state. The node state may be common to the plurality of interfaces. The update may be configured to transition the present state towards a target state. The target state may be associated with the node to generate an output consistent the one more data items.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

FIGS. 8A-8C are a program listing illustrating high level neuromorphic description of spiking neuron dynamics and stochastic properties configured for processing by a neuromorphic processing logic engine in order to implement synaptic updates, in accordance with one or more implementations.

Figure 1:
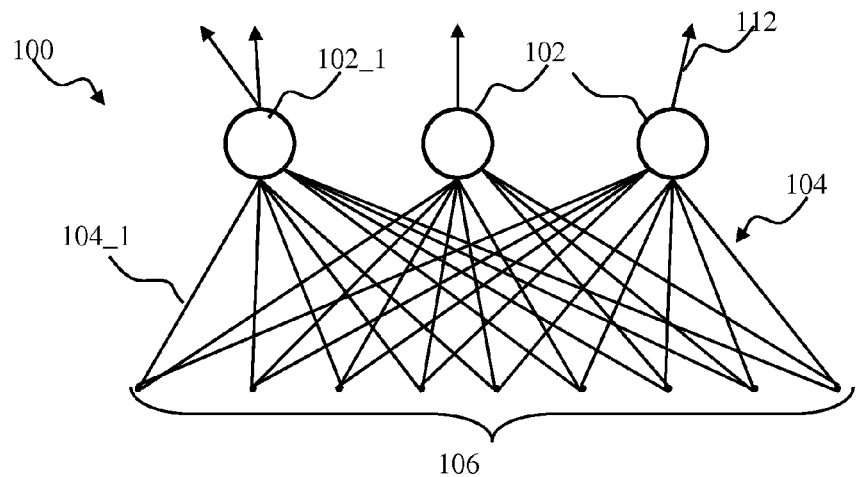
FIG. 1 is a block diagram depicting artificial spiking neural network according to the prior art.

All Figures disclosed herein are © Copyright 2012 Brain Corporation. All rights reserved.

DETAILED DESCRIPTION

Exemplary implementations of the present disclosure will now be described in detail with reference to the drawings, which are provided as illustrative examples so as to enable those skilled in the art to practice the disclosure. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or similar parts.

Where certain elements of these implementations can be partially or fully implemented using known components, only those portions of such known components that are necessary for an understanding of the present disclosure will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" may be meant generally to denote all types of interconnection or communication architecture that may be used to access the synaptic and neuron memory. The "bus" may be optical, wireless, infrared, and/or another type of communication medium. The exact topology of the bus could be for example standard "bus", hierarchical bus, network-on-chip, address-event-representation (AER) connection, and/or other type of communication topology used for accessing, e.g., different memories in pulse-based system.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB™, PASCAL, Python, assembly language, markup languages (e.g., HTML, SGML, XML, VoXML), object-oriented environments (e.g., Common Object Request Broker Architecture (CORBA)), Java™ (e.g., J2ME, Java Beans), Binary Runtime Environment (e.g., BREW), and/or other programming languages and/or environments.

As used herein, the terms "connection", "link", "transmission channel", "delay line", "wireless" may include a causal link between any two or more entities (whether physical or logical/virtual), which may enable information exchange between the entities.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" may be meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), application-specific integrated circuits (ASICs), and/or other types of integrated circuits.

As used herein, the terms "microprocessor" and "digital processor" may be meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the terms "node", "neuron", and "neuronal node" may be meant to refer, without limitation, to a network unit (e.g., a spiking neuron and a set of synapses configured to provide input signals to the neuron) having parameters that are subject to adaptation in accordance with a model.

As used herein, the terms "state" and "node state" may be meant generally to denote a full (or partial) set of dynamic variables used to describe node state.

As used herein, the term "synaptic channel", "connection", "link", "transmission channel", "delay line", and "communications channel" include a link between any two or more entities (whether physical (wired or wireless), or logical/virtual) which enables information exchange between the entities, and may be characterized by a one or more variables affecting the information exchange.

As used herein, the term "Wi-Fi" may include one or more of IEEE-Std. 802.11, variants of IEEE-Std. 802.11, standards related to IEEE-Std. 802.11 (e.g., 802.11a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

Overview

The present disclosure provides, among other things, a computerized apparatus and methods for facilitating state-dependent learning in spiking neuron networks by, inter alia, implementing generalized framework for plasticity updates. In one or more implementations, network updates may comprise modification of learning parameter of the network. In some implementations, the learning parameter may comprise synaptic efficacy. In some implementations, the updates may comprise plasticity rules effectuated using eligibility traces. In some implementations, the trace may comprise a temporary record of the occurrence of one or more events, such as visiting of a state, and/or the taking of an action (e.g., post-synaptic response), and/or a receipt of pre-synaptic input. The trace marks the parameters associated with the event (e.g., the synaptic connection, pre- and post-synaptic neuron IDs) as eligible for undergoing learning changes.

In some implementations, plasticity rule eligibility traces may be determined based on a rate of change of the trace at the update time. In one or more implementations plasticity rule eligibility traces may be determined based integrating the rate of change.

In one or more implementations, the plasticity update may comprise learning parameter update of a plurality of connections of a neuron. In one or more implementations, the plurality of connections may provide pre-synaptic input into the neuron.

In some implementations, the learning parameters associated with the plurality of connections may be updated concurrently with one another. In some implementations, modification of the plurality of learning parameters may be effectuated based on a product of a per-connection term and a per-neuron term. The per-connection term may be capable of characterizing dynamic process associated with individual connections and may be specific to that connection. The per-neuron may be capable of characterizing dynamics of the neuron and be common to all connections within the same neuron.

In accordance with the principles of the disclosure, multiple synaptic updates may be configured to be executed on per neuron basis, as opposed to per-synapse basis of prior art. The cumulative synaptic plasticity update in accordance with some implementations may be factored (decomposed) into multiple event-dependent connection change (EDCC) components, as described in detail, for example, in U.S. patent application Ser. No. 13/560,891 entitled "APPARATUS AND METHODS FOR EFFICIENT UPDATES IN SPIKING NEURON NETWORKS", filed Jul. 27, 2012, incorporated supra. The EDCC components may be configured to describe synapse plasticity change due to neuronal input spike (i.e., the spike transmitted by a synapse from a pre-synaptic neuron into a post-synaptic neuron) occurring at time $t_i \leq t_{update}$. In order to effectuate factoring of the synaptic updates, at individual ones of the update instances $t_{update}$ (e.g., cyclic and/or on-demand), two or more EDCC components may be computed, with individual components corresponding to one prior network state update time interval $t_i$. The number of EDCC components computed may be configured based on (i) the plasticity rule decay time scale used by the network, and (ii) the network update interval t. By way of illustration, if the plasticity decay time-scale T is 20 ms and the network state may be updated at 1 ms intervals, then at individual ones of the synaptic update events at time t, a number nT=T/t of EDCC components (nT=20 in one or more implementations) is computed, with individual components corresponding to the plasticity change due to input (pre-synaptic) spike occurring at time $t_i$=t−(i−1)×t, i={1, . . . nT}. It is noteworthy, that the nT EDCC components may be computed once for all synapses associated with the neuron, and the occurrence times of input spikes within the time interval (t−T) prior to updates may be used to reference appropriate EDCC component.

In some implementations, the generalized plasticity update framework of the disclosure may be used to implement modulated STDP eligibility traces useful, for example in reinforcement learning tasks such as adaptive control of a garbage collecting robot and/or search and rescue robot.

In some implementations, the generalized plasticity update framework of the disclosure may be used to implement state-dependent eligibility traces for a stochastic neuron configured in accordance with a spike-response process (SRP). Such realization may be useful, for example, in: (i) supervised applications such as learning used for spike pattern recognition; (ii) unsupervised learning, such as, maximization of information transmission, and/or other applications; and (iii) reinforcement learning applications, that may include stabilization of a robotic hand and/or other applications.

In some implementations, the generalized plasticity update framework of the disclosure may be used to implement STDP mechanisms (that are inspired by studies cerebellum). Cerebellum-type (CB) plasticity may comprise a long-term depression (LTD) mechanism configured based on the timing of the pre-synaptic input and of an auxiliary signal spike timing. The CB plasticity may comprise a non-associative long-term potentiation (LTP) may only depend on input spike timing. By way of illustration, the CB plasticity may be used in removing delays when controlling multi-joint robotic manipulator arms.

Spiking Neuron Network

Detailed descriptions of the various implementation of apparatus and methods of the disclosure are now provided. Although certain aspects of the disclosure can best be understood in the context of robotic adaptive control system comprising a spiking neural network, the disclosure is not so limited. Implementations of the disclosure may also be used for implementing a variety of learning systems, such as, for example, sensory signal processing (e.g., computer vision), signal prediction (e.g., supervised learning), finance applications, data clustering (e.g., unsupervised learning), inventory control, data mining, and/or other applications that do not require performance function derivative computations.

Implementations of the disclosure may be, for example, deployed in a hardware and/or software implementation of a neuromorphic computer system. In some implementations, a robotic system may include a processor embodied in an application specific integrated circuit, which can be adapted or configured for use in an embedded application (e.g., a prosthetic device).

Figure 4:
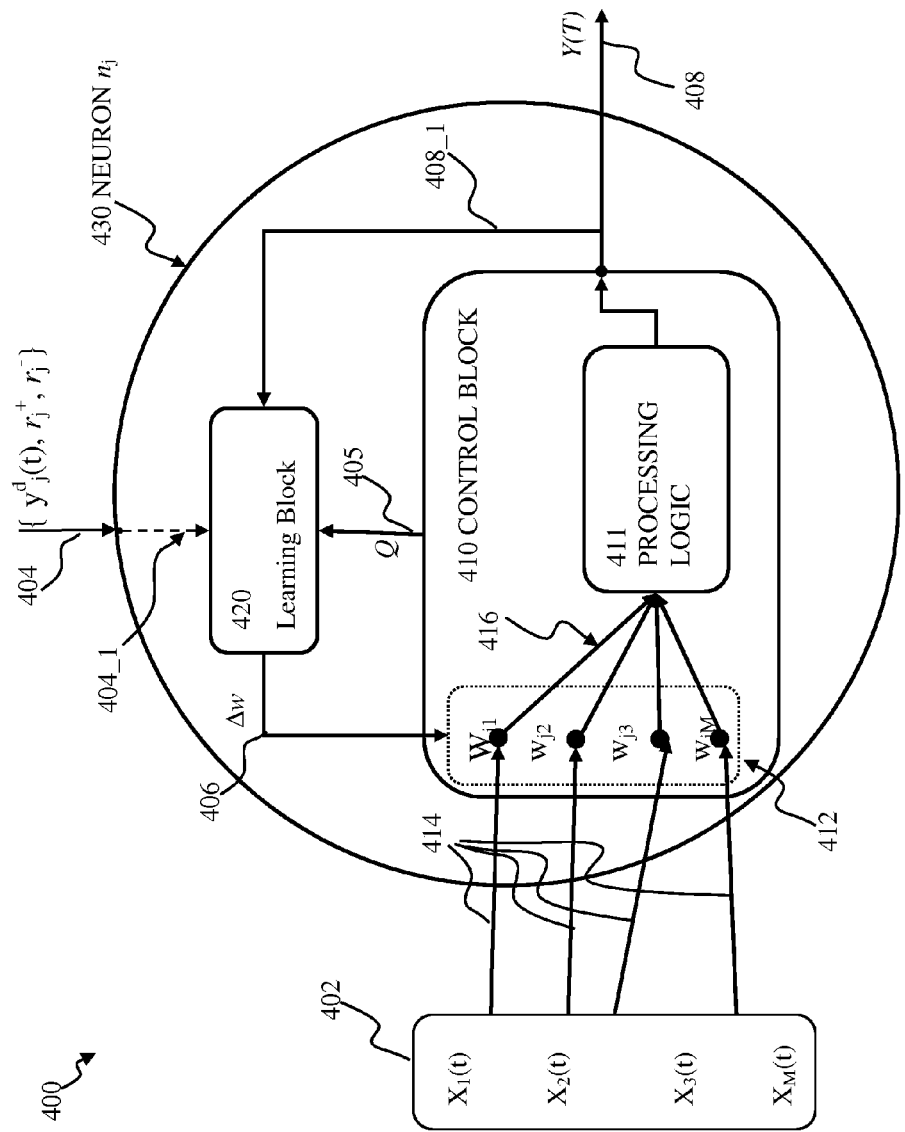
FIG. 4 is a block diagram illustrating spiking neural network configured to effectuate multiple learning rules, in accordance with one or more implementations.

Referring now to FIG. 4, one implementation of spiking network apparatus for effectuating the generalized learning framework of the disclosure is shown and described in detail. The network 400 may comprise at least one stochastic spiking neuron 430, operable according to, for example, a Spike Response Process (SRP), and configured to receive M-dimensional input spiking stream X(t) 402 via M-input connections 414. In some implementations, the M-dimensional spike stream may correspond to M-input synaptic connections into the neuron 430. As shown in FIG. 4, individual input connections may be characterized by a connection parameter 412 $w_{ij}$ that may be configured to be adjusted during learning. In one or more implementation, the connection parameter may comprise connection efficacy (e.g., weight). In some implementations, the parameter 412 may comprise synaptic delay. In some implementations, the parameter 412 may comprise probabilities of synaptic transmission.

The following signal notation may be used in describing operation of the network 400, below:

$y(t)=\Sigma_k \delta(t-t_k^{out})$ denotes the output spike pattern, corresponding to the output signal 408 produced by the control block 410, where $t_k$ denotes the times of the output spikes generated by the neuron; and $y^d(t)=\Sigma_{tk} \delta(t-t_k^d)$ denotes the teaching spike pattern, corresponding to the desired (or reference) signal that is part of external signal 404 of FIG. 4, where tk denotes the times when the spikes of the reference signal may be received by the neuron.

In some implementations, the neuron 430 may be configured to receive training inputs, comprising the desired output (reference signal) $y^d(t)$ via the connection 404. In some implementations, the neuron 430 may be configured to receive positive and negative reinforcement signals via the connection 404. Accordingly, parameters $r^+$, $r^-$ in of FIG. 4 denotes the reinforcement signal spike stream, that may be expressed as:

$$r^+(t)=\Sigma_i \delta(t-t_i^+), r^-(t)=\Sigma_i \delta(t-t_i^-),$$

where $t_i^+, t_i^-$ denote the spike times associated, for example, with positive and negative reinforcement, respectively.

The neuron 430 may be configured to implement the control block 410 which may be configured to control, for example, a robotic arm and may be parameterized by the weights of connections between artificial neurons, and a learning block 420, which may implement learning and/or calculating the changes in the connection weights. The control block 410 may receive an input signal x, and may generate an output signal y. The output signal y may include motor control commands configured to move a robotic arm along a desired trajectory. The control block 410 may be characterized by a system model comprising system internal state variables q. The internal state variable q may include a membrane voltage of the neuron, conductance of the membrane, and/or other variables. The control block 410 may be characterized by learning parameters w, which may include synaptic weights of the connections, firing threshold, resting potential of the neuron, and/or other parameters. In one or more implementations, the parameters w may comprise probabilities of signal transmission between the units (e.g., neurons) of the network.

The input signal x(t) may comprise data used for solving a particular control task. In one or more implementations, such as those involving a robotic arm or autonomous robot, the signal x(t) may comprise a stream of raw sensor data (e.g., proximity, inertial, and/or terrain imaging) and/or preprocessed data (e.g., velocity, extracted from accelerometers, distance to obstacle, and/or positions). In some implementations, such as those involving object recognition, the signal x(t) may comprise an array of pixel values (e.g., RGB, CMYK, HSV, HSL, and/or grayscale) in the input image, or preprocessed data (e.g., levels of activations of Gabor filters for face recognition, contours, and/or other preprocessed data). In one or more implementations, the input signal x(t) may comprise desired motion trajectory, for example, in order to predict future state of the robot on the basis of current state and desired motion.

The control block 410 of FIG. 4 may comprise a probabilistic dynamic system, which may be characterized by an analytical input-output (x→y) probabilistic relationship having a conditional probability distribution associated therewith:

$$P = p(y|x, w) \quad (\text{Eqn. 7})$$

In Eqn. 7, parameter w may denote various system parameters including connection efficacy, firing threshold, resting potential of the neuron, and/or other parameters. The analytical relationship of Eqn. 7 may be selected such that the gradient of ln [p(y|x,w)] with respect to the system parameter w exists and can be calculated. The neuronal network shown in FIG. 4 may be configured to estimate rules for changing the system parameters (e.g., learning rules) so that the performance function F(x,y,r) may be minimized (or maximized) for the current set of inputs and outputs and system dynamics.

In some implementations, the control performance function may be configured to reflect the properties of inputs and outputs (x,y). The values F(x,y,r) may be calculated directly by the learning block 420 without relying on external signal r when providing solution of unsupervised learning tasks.

In some implementations, the value of the function F may be calculated based on a difference between the output y of the control block 410 and a reference signal $y^d$ characterizing the desired control block output. This configuration may provide solutions for supervised learning tasks, as described in detail below.

In some implementations, the value of the performance function F may be determined based on the external signal r. This configuration may provide solutions for reinforcement learning tasks, where r represents reward and punishment signals from the environment.

Figure 2:
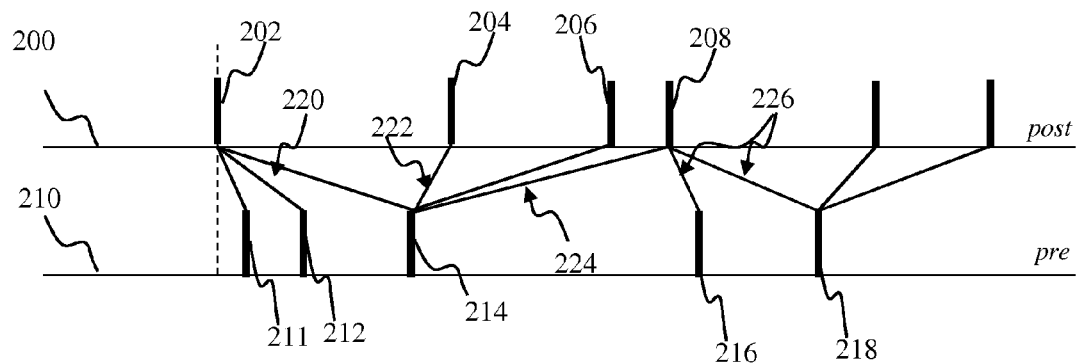
FIG. 2 is a graphical illustration depicting spike timing in the spiking network of FIG. 1, according to the prior art.
Figure 3:
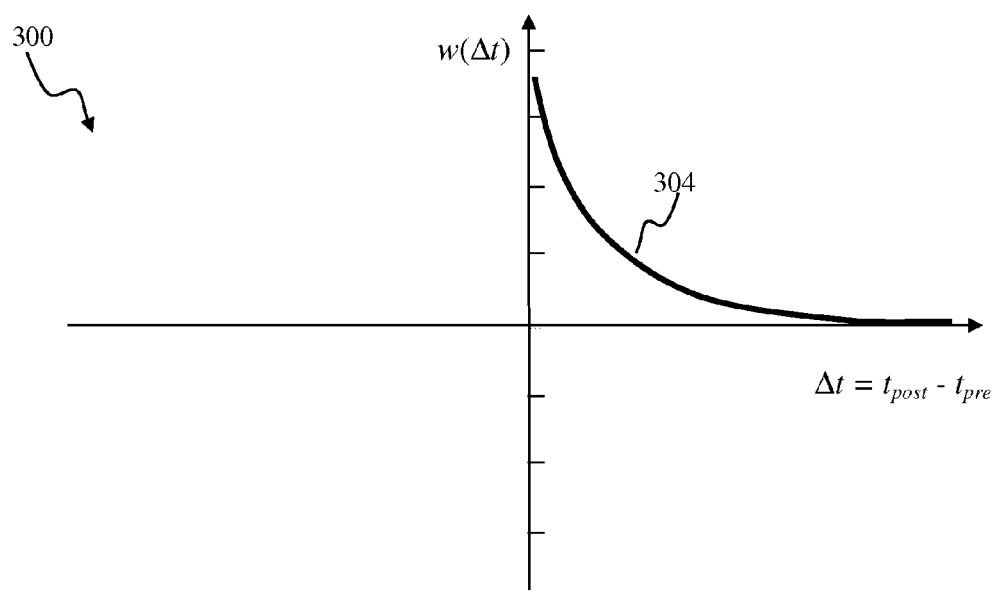
FIG. 3 is a plot depicting spike time dependent plasticity spike timing in the spiking network of FIG. 1, according to the prior art.

The learning block 420 may comprise learning framework according to the implementation described in co-pending and co-owned U.S. patent application Ser. No. 13/487,533, entitled "STOCHASTIC SPIKING NETWORK LEARNING APPARATUS AND METHODS" filed Jun. 4, 2012, that enables generalized learning methods without relying on calculations of the performance function F derivative in order to solve unsupervised, supervised and/or reinforcement learning tasks. The block 420 may receive the input x and output y signals (denoted by the arrow 402_1, 408_1, respectively, in FIG. 2), as well as the state information q 405. In some implementations, such as those involving supervised and reinforcement learning, external teaching signal r may be provided to the block 420 as indicated by the arrow 404 in FIG. 4. The teaching signal may comprise, in some implementations, the desired motion trajectory, and/or reward and punishment signals from the external environment.

In one or more implementations the learning block 420 may optimize performance of the control system (e.g., the network 400 of FIG. 4) that may be characterized by minimization of the average value of the performance function F(x, y, r) as described in detail below.

Optimization of performance of the control system (e.g., the network 430 of FIG. 4) may, in some implementations, be achieved via maximization of the average of the performance function, as described in detail for example, in a co-owned and co-pending U.S. patent application Ser. No. 13/487,499 entitled "STOCHASTIC APPARATUS AND METHODS FOR IMPLEMENTING GENERALIZED LEARNING RULES, incorporated supra.

In one or more implementations, instantaneous probability density of the neuron producing a response may be determined using neuron membrane voltage u(t) for continuous time chosen as an exponential stochastic threshold:

$$\lambda(t) = \lambda_0 e^{\kappa(u(t) - \theta)} \quad (\text{Eqn. 8})$$

where:
  u(t) is the membrane voltage of the neuron,
  θ is the voltage threshold for generating a spike,
  κ is the probabilistic parameter, and
  $\lambda_0$ is the basic (spontaneous) firing rate of the neuron.

For discrete time steps, an approximation for the probability Λ(u(t))∈(0,1] of firing in the current time step may be given by:

$$\Lambda(u(t)) = 1 - e^{-\lambda(u(t))\Delta t} \quad (\text{Eqn. 9})$$

where Δt is time step length.

In some implementations, a score function $$g_i \equiv \frac{\partial h(y \mid x)}{\partial w_i}$$

may be utilized in order to determine changes for individual spiking neuron parameters. If spiking patterns may be viewed on finite interval length T as an input x and output y of the neuron, then the score function may take the following form:

$$g_i = \frac{\partial h(y_T \mid x_T)}{\partial w_i} = -\sum_{t_l \in y_T} \frac{1}{\lambda(t_l)} \frac{\partial \lambda(t_l)}{\partial w_i} + \int_T \frac{\partial \lambda(s)}{\partial w_i} ds. \quad (\text{Eqn. 10})$$

where time moments $t_l$ belong to neuron's output pattern $y_T$ (neuron generates spike at these time moments). If an output of the neuron at individual time moments is considered (e.g., whether there is an output spike or not), then an instantaneous value of the score function may be calculated using a time derivative of the interval score function:

$$g_i = \frac{\partial h_{\Delta t}}{\partial w_i} = \frac{\partial \lambda}{\partial w_i} \left( 1 - \sum_l \frac{1 - \Lambda(t)}{\Lambda(t)} \delta_d(t - t_l) \right) \quad (\text{Eqn. 11})$$

where $t_1$ is the time of output spike, and $\delta_d(t)$ is the Kronecker delta.

In one or more implementations, the score function values for the stochastic Integrate-and-Fire neuron discrete time may be determined as follows:

$$g_i = \quad (\text{Eqn. 12})$$

$$\frac{\partial h_{\Delta t}(y(t) \mid x)}{\partial w_i} = \kappa \lambda(t) \sum_{t_j^i \in x^i} \alpha(t - t_j^i) \left( 1 - \sum_{t^{out} \in y} \frac{\delta_d(t - t^{out})}{\Lambda(t)} \right) \Delta t$$

where:
  $t^{out}$ denote the output spike time instances; and
  α denotes the alpha-function.

State variables q (e.g., probability of firing λ(t)) associated with the control model may be provided to the learning block 420 via the pathway 405. The learning block 420 of the neuron 430 may receive the output spike train y(t) via the pathway 408_1.

In one or more implementations, the input interfaces (i.e., the connections 414 of the network 400 of FIG. 4) may be operated according a linear dynamic process that may be expressed as:

$$\frac{d\vec{S}_i(t)}{dt} + A(q, t, t^{out})\vec{S}_i(t) = \vec{k}_i \sum_j \delta(t - t_j^{in}) + \sum_{t^{out}} Rs(t)\delta(t - t^{out}) \quad \text{(Eqn. 13)}$$

$$\frac{de_i(t)}{dt} + \frac{e_i(t)}{\tau} = Q(t)S_i(t). \quad \text{(Eqn. 14)}$$

where $Q(t)$, $S_i(t)$ denote neuron-specific and connection specific portions of the plasticity adjustment rule, respectively.

In one or more implementations, connection dynamic process may be described using stable dynamic equations (e.g., Eqn. 13, Eqn. 14) so that their respective solutions $S_i(t)$, $e_i(t)$ decay exponentially with time. Accordingly, such dynamic process, comprise exponentially decaying effects ('memory') of external influences (the right-hand side terms parts of Eqn. 13 and Eqn. 14 describing the input spikes and the term $Q(t) S_i(t)$, respectively) that may produce substantially diminished effects of external influences (e.g., spikes) on the synapse dynamics when these events occur sufficiently far in the past. The exponential decay thus allows characterization of synapse dynamics that may be based on inputs occurring within the time interval (t–T), where T is determined based on the dynamics of the system (i.e., the matrix A in Eqn. 13 the time scale τ in Eqn. 14). By way of example, the time interval T may be configured equal to τ in one or more implementations, while in some implementations T may be determined as $T=1/\lambda_{max}$, where $\lambda_{max}$ is maximum real part of the eigenvalues the matrix A in Eqn. 13.

It is noteworthy that as Eqn. 13 and Eqn. 14 comprise linear differential equations, the superposition principle may be applied in order to obtain solutions $S_i(t)$ and $e_i(t)$, in one or more implementations. Specifically, the right-hand sides of Eqn. 13 may be decomposed into plurality of event-dependent connection change basis vectors $b_m(t)$, and the right-hand sides of Eqn. 14 may be decomposed into plurality of event-dependent connection change (EDCC) components Mt), as described, for example in U.S. patent application Ser. No. 13/560,891 entitled "APPARATUS AND METHODS FOR EFFICIENT UPDATES IN SPIKING NEURON NETWORKS", filed Jul. 27, 2012, incorporated supra. Accordingly, using the superposition, the state response $S_i(t)$ of the $i^{th}$ connection to an input spike $s^{in}(t_m)$ within the interval (t–T) of the input spike train $\Sigma_j \delta(t-t_j^{in})$ may be determined as a linear combination of contributions of individual basis vectors associated with individual $m^{th}$ spikes within the input spike train $s^{in}(t_m)$. Similarly, the eligibility trace $e_i(t)$ of the $i^{th}$ connection may be determined as a linear combination of contributions of individual EDCC components $y_m(t)$ associated with individual $m^{th}$ spikes within the input spike train $s^{in}(t_m)$. In one implementation, the superposition may be effectuated using weighted linear combination, as described, for example, in U.S. patent application Ser. No. 13/560,891 entitled "APPARATUS AND METHODS FOR EFFICIENT UPDATES IN SPIKING NEURON NETWORKS", filed Jul. 27, 2012, incorporated supra. In some implementations, the EDCC components may be pre-computed (once per neuron) and linearly combined in order to determine solutions of Eqn. 13, Eqn. 14 (e.g., $S_i(t)$ and $e_i(t)$) at the time of the update t for individual ones of the connections 414. In some implementations, the event-dependent connection change (EDCC) may comprise eligibility trace configured for adapting connection weights (e.g., synaptic weights).

Furthermore, in some implementations, the neuronal dynamic process (e.g., Eqn. 13 and Eqn. 14) may comprise non-stationary the matrix A and/or Q. Provided that the process is stable (i.e., the solution of Eqn. 13 and Eqn. 14 decays with time), these solutions at time $t_{up}$ may be obtained by evaluating the process state over the ($t_{up}$–T) time interval. It is noteworthy that because of stability of equations, solution of homogeneous equations (where right-hand side is zero) decays to zero. A sufficiently large time interval T, compared to the time decay scale of Eqn. 13, Eqn. 14, may correspond, in some implementations, to zero initial conditions of Eqn. 13 and Eqn. 14.

It will be appreciated by those skilled in the arts that neural network dynamics represented by Eqn. 13 and Eqn. 14 may comprise one implementation and the framework of the innovation is not so limited and may be utilized with any network synaptic dynamics that may be described using linear and stable process so that superposition principle may be used.

Modulated STDP

In one or more implementations, the EDCC components may comprise one or more eligibility trace configured for implementing synaptic plasticity, such as, for example, adapting weights of synaptic connections. In one such implementation described in detail in U.S. Pat. No. 8,103,602, entitled "SOLVING THE DISTAL REWARD PROBLEM THROUGH LINKAGE OF STDP AND DOPAMINE SIGNALING" filed Dec. 21, 2007, the plasticity mechanism, useful with the efficient update methodology of the present disclosure, may comprise STDP that is modulated by an additional parameter. In some implementations, the parameter may be configured as specific to individual neurons. In one or more implementations, the parameter may be configured network-wide, such as for example, when simulating reward actions of biological neurotransmitter dopamine.

In some implementations of the modulated STDP process (e.g., Eqn. 13, Eqn. 14) may be expressed using the following framework:

a one dimensional synapse state vector $\vec{S}_i(t)=S_i(t)$;
synaptic coefficient vector $k_i=1$;
one-dimensional matrix $$A(q, t, t^{out}) = \frac{1}{\tau_s}$$

that does not depend on input and/or output activity and is time invariant, where $\tau_s$ is STDP time constant (typically 30-100 ms);

synapse reset condition after post-synaptic spike $Rs(t)=-S_i(t)$;

$$Q(t) = \sum_{t^{out}} \delta(t - t^{out}) \quad \text{(Eqn. 15)}$$

$$\frac{dS_i(t)}{dt} = -\frac{1}{\tau_s}S_i(t) + \sum_j \delta(t - t_j^{in}) - \sum_{t^{out}} S_i(t)\delta(t - t^{out}) \quad \text{(Eqn. 16)}$$

-continued $$\frac{de_i(t)}{dt} = -\frac{e_i(t)}{\tau} + S_i(t) \sum_{t^{out}} \delta(t - t^{out})$$ (Eqn. 17)

where:

τ is an eligibility traces time constant (typically 50-500 ms), $S_{ik}(t)$ is a k-th element in the synaptic state vector $\vec{S}_i$.

In some implementations, the basis vectors $\vec{b}_m(t)$ may be expressed using exponents referenced to the time of presynaptic spike $t - m \times \Delta t$:

$$\vec{b}_m(t) = H(t - m\Delta t)e^{-(t - m\Delta t)/\tau_s}.$$ (Eqn. 18)

As seen from Eqn. 18, the component vectors $\vec{b}_m(t)$ do not depend on the input and/or output spike time. Accordingly, the vector traces $\vec{b}_m(t)$ may be pre-computed, in one or more implementations, in advance of neuron network operation. In some implementations, the computational load associated with executing updates of a spiking neuron network may be reduced by using these pre-computed during the duration of network operation in lieu of re-computing the components at a time of the update is to be performed In one or more implementations, synaptic connection weight changes may be based on an additional spiking signal D(t) as follows:

$$\frac{dw_i}{dt} = \delta(t - t^r) * e_i,$$ (Eqn. 19)

where $t^r$ is the arrival time associates with spikes of D(t). In some implementations, the signal D(t) may be used to implement reward-based learning.

State-Dependent Eligibility Traces for Stochastic SRP Neuron

In one or more implementations, EDCC components may comprise one or more eligibility trace configured for implementing connection updates, such as, for example, adapting weights of synaptic connections. In one or more implementations of a stochastic neuron operable according to a spike-response process (SRP), the eligibility trace may be configured as dependent on a state of the connection at the time of the respective event (e.g., the input spike).

In one such implementation, the update process (e.g., Eqn. 13, Eqn. 14) may be expressed using the following framework:

two dimensional synapse state vector $\vec{S}_i(t) = \{S_i(t), x_i(t)\}$;

$\vec{k}_i = \{0, 1\}$ time and activity independent two-dimensional matrix, expressed as:

$$A(q, t, t^{out}) = \left[\left\{\frac{1}{\tau_{s1}}, -1\right\}; \left\{0, \frac{1}{\tau_{s2}}\right\}\right];$$ (Eqn. 20)

reset of synapse state to zero after individual post-synaptic spikes, expressed as $Rs(t) = \vec{S}_1(t)$; and function of a state of the neuron in discrete time (e.g., Eqn. 12), expressed as:

$$Q(t) = \kappa \lambda(t) \left(1 - \sum_{t^{out}} \frac{\delta(t - t^{out})}{\Lambda(t)}\right) \Delta t$$ (Eqn. 21)

Accordingly, the update process may be characterized as follows:

$$\frac{dS_i(t)}{dt} = -\frac{1}{\tau_{s1}} S_i(t) + x_i(t) - \sum_{t^{out}} S_i(t) \delta(t - t^{out})$$ (Eqn. 22)

$$\frac{dx_i(t)}{dt} = -\frac{1}{\tau_{s2}} x_i(t) + \sum_j \delta(t - t_j^{in}) - \sum_{t^{out}} x_i(t) \delta(t - t^{out})$$ (Eqn. 23)

$$\frac{de_i(t)}{dt} = -\frac{e_i(t)}{\tau} + S_i(t) Q(t)$$ (Eqn. 24)

where:

$\tau_s$ is a STDP time constant (typically 30-100 ms),

τ is an eligibility traces time constant (typically 50-500 ms), and $S_{ik}(T)$ is a k-th element in the synaptic state vector $\vec{S}_i$.

In one or more implementations, weights changes may be configured based on an additional signal F(t) as follows:

$$\frac{dw_i}{dt} = F(t) e_i,$$ (Eqn. 25)

where F(t) is the performance function associated with the learning process effectuated by the neuron network updates. In one or more implementations, learning may be effectuated by minimizing the performance function F(t), as described for example in a co-owned and co-pending U.S. patent application Ser. No. 13/487,499, entitled "STOCHASTIC APPARATUS AND METHODS FOR IMPLEMENTING GENERALIZED LEARNING RULES" filed Jun. 4, 2012, incorporated herein by reference in its entirety.

In some implementations, the efficient update methodology described herein may be effectuated using high level neuromorphic language description (HLND) described in detail in co-pending and co-owned U.S. patent application Ser. No. 13/385,938 entitled "TAG-BASED APPARATUS AND METHODS FOR NEURAL NETWORKS" filed on Mar. 15, 2012, incorporated herein by reference in its entirety. FIG. 13 presents one exemplary HLND script configured to effectuate state-dependent eligibility trace for use, for example with methods of FOGS. 9A-9D described supra.

Eligibility Traces with Non-Associative LTP Term

In one or more implementations, EDCC components may comprise one or more eligibility trace configured for implementing non associative connection updates, such as, for example, adapting weights of synaptic connections, comprising long term connection depression (LTD).

In one such implementation, the update process (e.g., Eqn. 13, Eqn. 14) may be expressed using the following framework:

one dimensional synapse state vector $\vec{S}_i(t) = S_i(t)$;

$k_i = 1$ time and activity independent one-dimensional matrix, expressed as $$A(q, t, t^{out}) = \frac{1}{\tau_s};$$

reset of synapse state to zero after individual post-synaptic spikes $Rs(t) = -S_i(t)$; and
neuron state process, expressed as:

$$Q(t) = -\sum_{t^{out}} \delta(t - t^{out}) + P \quad \text{(Eqn. 26)}$$

$$\frac{dS_i(t)}{dt} = -\frac{1}{\tau_s} S_i(t) + \sum_j \delta(t - t_j^{in}) - \sum_{t^{out}} S_i(t)\delta(t - t^{out}) \quad \text{(Eqn. 27)}$$

$$\frac{de_i(t)}{dt} = -\frac{e_i(t)}{\tau} + S_i(t)\left(\sum_{t^{out}} \delta(t - t^{out}) - P\right) \quad \text{(Eqn. 28)}$$

where:
$\tau_s$ is a STDP time constant (typically 30-100 ms),
$\tau$ is an eligibility traces time constant (typically 50-500 ms),
$S_{ik}(T)$ is a k-th element in the synaptic state vector $\vec{S}_i$, and
P is a non-associative LTP (for e.g., non-associative potentiation of weights that received input spikes).

In some implementations, the basis vectors $\vec{b}_m(t)$ may be expressed using exponents referenced to the time of presynaptic spike t−×Δt:

$$\vec{b}_m(t) = H(t - m\Delta t)e^{-(t - m\Delta t)/\tau_s}. \quad \text{(Eqn. 29)}$$

As seen from Eqn. 29, the component vectors $\vec{b}_m(t)$ do not depend on the input and/or output spike time. Accordingly, the vector traces $\vec{b}_m(t)$ may be pre-computed, in one or more implementations, in advance of neuron network operation. In some implementations, the computational load associated with executing updates of a spiking neuron network may be reduced by using these pre-computed during the duration of network operation in lieu of re-computing the components at a time of the update is to be performed.

In one or more implementations, weight changes may be effectuated by an additional spiking signal:

$$\frac{dw_i}{dt} = \delta(t - t^r)e_i, \quad \text{(Eqn. 30)}$$

where $t^r$ time of arrival of the additional signal spikes.

Focused Exploration STDP

In one or more implementations, EDCC components may comprise one or more eligibility trace configured for implementing reward-based focused exploration during reinforcement learning. In one or more implementations, the exploration may comprise potentiation of inactive neurons, as described for example a co-owned U.S. patent application Ser. No. 13/489,280 entitled "APPARATUS AND METHODS FOR REINFORCEMENT LEARNING IN ARTIFICIAL NEURAL NETWORKS", filed Jun. 5, 2012, [client reference BC201204A] incorporated supra.

In one such implementation, the update process (e.g., Eqn. 13, Eqn. 14) may be expressed using the following framework:

one dimensional synapse state vector $\vec{S}_i(t) = S_i(t)$;
$k_i = 1$ time and activity independent one-dimensional matrix $$A(q, t, t^{out}) = \frac{1}{\tau_s};$$

reset of synapse state to zero after individual post-synaptic spikes, expressed as $Rs(t) = -S_i(t)$;
function of a state of the neuron $$Q(t) = \sum_{t^{out}} \delta(t - t^{out}) + P * H(-R(t)) \quad \text{(Eqn. 31)}$$

$$\frac{dS_i(t)}{dt} = -\frac{1}{\tau_s} S_i(t) + \sum_j \delta(t - t_j^{in}) - \sum_{t^{out}} S_i(t)\delta(t - t^{out}) \quad \text{(Eqn. 32)}$$

$$\frac{de_i(t)}{dt} = -\frac{e_i(t)}{\tau} + S_i(t)Q(t) \quad \text{(Eqn. 33)}$$

where:
$\tau_s$ is a STDP time constant (typically 30-100 ms),
$\tau$ is an eligibility traces time constant (typically 50-500 ms),
$S_{ik}(t)$ is a k-th element in the synaptic state vector $\vec{S}_i$,
P describes non-associative LTD (for e.g., non-associative depression of weights that received input spikes), and
H(x) is a Heaviside step function that is equals to 1 if argument is positive, 0 otherwise.

In some implementations, the basis vectors $\vec{b}_m(t)$ may be expressed using exponents referenced to the time of presynaptic spike t−m×Δt:

$$\vec{b}_m(t) = H(t - m\Delta t)e^{-(t - m\Delta t)/\tau_s}. \quad \text{(Eqn. 34)}$$

As seen from Eqn. 34, the component vectors $\vec{b}_m(t)$ do not depend on the input and/or output spike time. Accordingly, the vector traces $\vec{b}_m(t)$ may be pre-computed, in one or more implementations, in advance of neuron network operation. In some implementations, the computational load associated with executing updates of a spiking neuron network may be reduced by using these pre-computed during the duration of network operation in lieu of re-computing the components at a time of the update is to be performed.

In one or more implementations, weights changes may be configured based on an additional signal R(t) as follows:

$$\frac{dw_i}{dt} = R(t)e_i, \quad \text{(Eqn. 35)}$$

where R(t) is the reinforcement (e.g., reward and/or punishment) signal associated with the learning process effectuated by the neuron network updates. In one or more implementations, learning may be effectuated by selectively potentiating inactive neurons in accordance with the reinforcement signal, as described for example in a co-owned and co-co-owned U.S. patent application Ser. No. 13/489,280 entitled "APPARATUS AND METHODS FOR REINFORCEMENT LEARNING IN ARTIFICIAL NEURAL NETWORKS", filed Jun. 5, 2012, [client reference BC201204A], incorporated supra.

Exemplary Methods

FIGS. 5-9 illustrate methods of efficient connection updates for a neuron of a neural network in accordance with one or more implementations. The operations of methods FIGS. 5-9 described below are intended to be illustrative. In some embodiments, methods 500, 600, 700, and/or 900 may be accomplished with one or more additional operations not described, and/or without one or more of the operations discussed. Additionally, the order in which the operations of methods are illustrated in FIGS. 5-9 and described below is not intended to be limiting.

In one or more implementations, methods of FIGS. 5-9 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500, 600, 700, and/or 900 in response to instructions stored electronically on an electronic storage medium. The one or more processing devices may include one or more devices configured through hardware, firmware, and/or software to be specifically designed for execution of one or more of the operations of methods 500, 600, 700, and/or 900.

Figure 5:
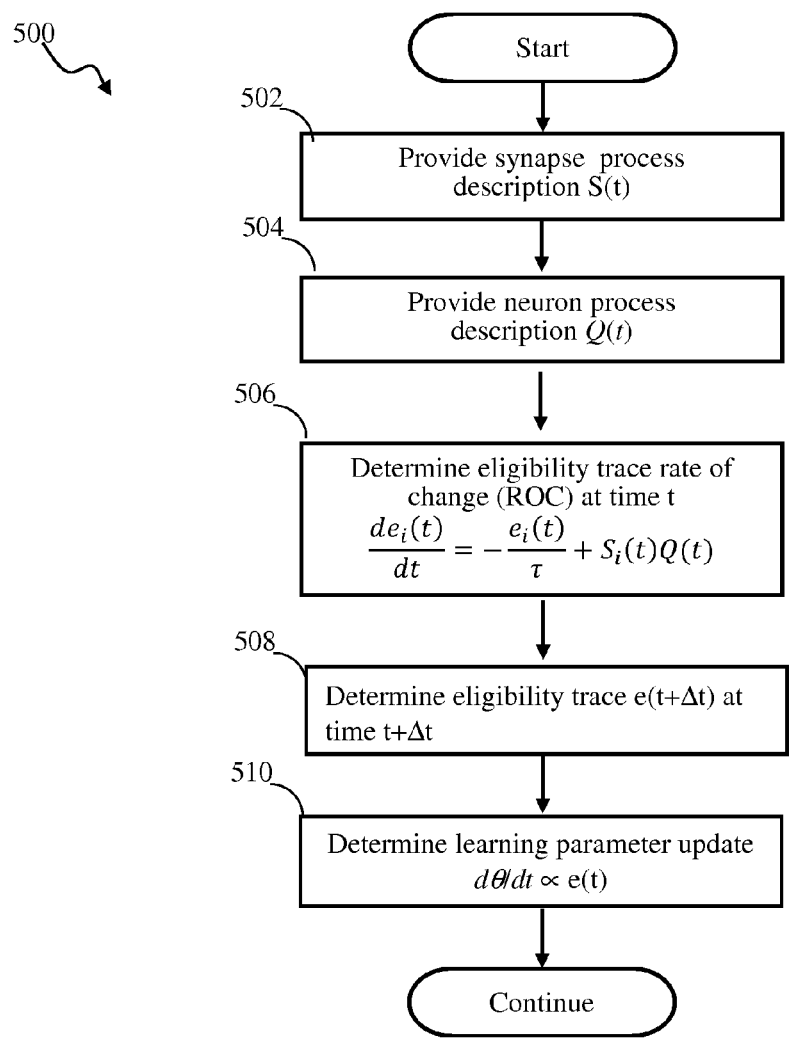
FIG. 5 is a logical flow diagram illustrating generalized update method, for use with network connections of FIG. 4, in accordance with one or more implementations.

Referring now to FIG. 5 one exemplary implementation of the generalized update method of the disclosure for use with, for example, the neuron 430 of FIG. 4 may be described in detail. The method 500 of FIG. 5 may allow users to implement a broad range of plasticity rules, such as, for example (i) modulated STDP, state dependent plasticity, cerebellum-type plasticity, and/or other update types.

At step 502 of method 500 the synaptic connection process description $S_i(t)$ may be provided. In some implementations, the generalized synaptic connection process description $S_i(t)$ of Eqn. 16 may be expressed using realizations of, Eqn. 22, Eqn. 27, Eqn. 32, described above.

At step 504 description of neuron state process $Q(t)$ may be provided. In one or more implementations, the neuron process may comprise stochastic spike response process of Eqn. 21. In one or more implementations, the neuron process may comprise deterministic process described, for example by Eqn. 15, Eqn. 26, Eqn. 31, and/or other appropriate process description.

At step 506, rate of change (ROC) of eligibility traces for one or more connections may be determined. In some implementations, the connection eligibility trace ROC may be determined using Eqn. 14. In some implementations, the ROC may be determined using formulations of Eqn. 17, Eqn. 24, Eqn. 28, Eqn. 33 and/or other realizations.

At step 508, present value of the eligibility trace $e(t+\Delta t)$ at time $t+\Delta t$ may be determined. In one or more implementations, the present value of the eligibility trace may be determined based on a prior eligibility trace value and an adjustment term. In some implementations the adjustment term may comprise a product of the connection-specific parameter $S(t)$ and neuron-specific parameter $Q(t)$ as follows:

$$e_i(t+\Delta t) = -\frac{e_i(t)}{\tau} + Q(t)S_i(t). \tag{Eqn. 36}$$

In some implementations, the connection eligibility trace may be determined by integrating formulations Eqn. 17, Eqn. 24, Eqn. 28 Eqn. 33 and/or other appropriate realizations.

At step 510, learning parameter of multiple connections may be updated. In some implementations, the learning parameter may comprise connection synaptic weight. In one or more implementations, the update may be effectuated using formulations of Eqn. 19, Eqn. 25, Eqn. 30, Eqn. 35 and/or other appropriate realizations.

Figure 6:
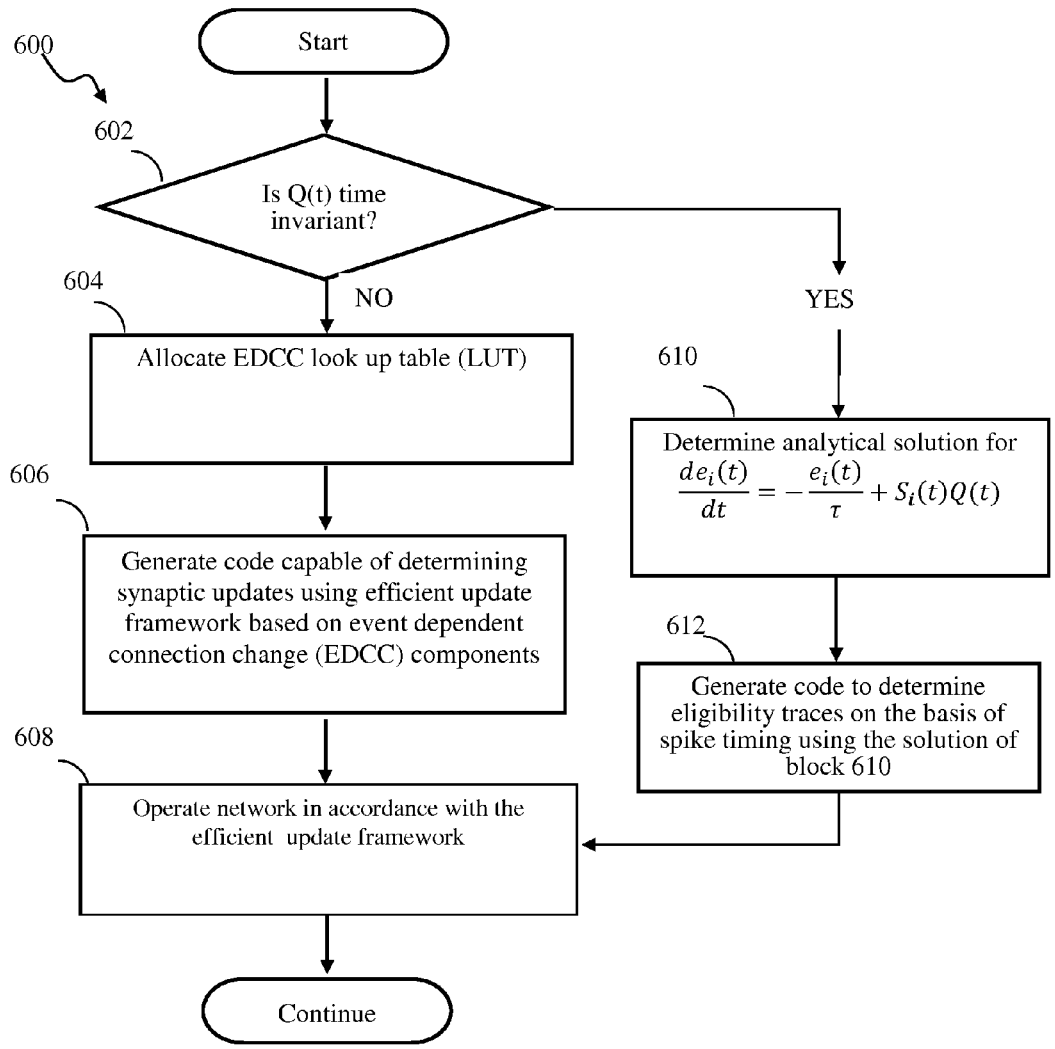
FIG. 6 is a logical flow diagram illustrating network configuration for implementing efficient update method, for use with network connections of FIG. 4, in accordance with one or more implementations.

FIG. 6 illustrates one exemplary implementation of network operation in accordance with generalized update framework of the disclosure for use with, for example, the neuron 430 of FIG. 4. The method 600 of FIG. 9 may allow users to effectuate automatic network configuration in accordance with the desired plasticity update mechanism prior to network operation.

At step 602 of method 600 determination may be made as to whether neuronal state process $Q(t)$ is time invariant.

When $Q(t)$ is independent of time (such as, for example, when neuron portion of the connection weight adjustment rule does not change, e.g., $\Delta w \propto u^d$, d=const), an analytical solution for the eligibility trace may be determined at step 610.

Subsequently, at step 612, computer code may be generated in order to implement determination of eligibility traces on the basis of spike timing using the analytical solution determined at step 610, above. By way of illustration, in one implementation, the analytical solution of step 610 may be expressed as $$e(t) = \exp(-(t-t_{in})); \tag{Eqn. 37}$$

Accordingly, the computer code of step 612 may comprise code capable of implementing the relationship of Eqn. 37.

When $Q(t)$ is time dependent, such as, for example, when neuron portion of the connection weight adjustment rule does may depend on neuron state and/or time, e.g., $\Delta w \propto u^d$, d=d(t); d=d(u(t))), an efficient STDP methodology may be employed.

In some implementations, efficient update methodology described in U.S. patent application Ser. No. 13/560,891 entitled "APPARATUS AND METHODS FOR EFFICIENT UPDATES IN SPIKING NEURON NETWORKS", filed Jul. 27, 2012, incorporated supra, may be employed. In one or more implementations, the above-references efficient update methodology may comprise look-up table (LUT) configured to store an array of basis vectors $b_m$ configured to provide event-dependent connection change components.

Accordingly, at step 604, the LUT may be allocated. In some implementations, the LUT may be allocated in neuron and/or synaptic memory, as described for example in a commonly owned and co-pending U.S. patent application Ser. No. 13/239,255 filed Sep. 21, 2011, entitled "APPARATUS AND METHODS FOR SYNAPTIC UPDATE IN A PULSE-CODED NETWORK", [client reference BRAIN.008A] incorporated herein by reference in its entirety. In some implementations, the LUT may be allocated in synaptic and/or neuron memory, comprising shared memory, such as, for example memory block 1108 of FIG. 11A. In some implementations, the LUT may be allocated in neuron specific memory (e.g., memory block 1134 of FIG. 11B).

At step 606, code capable of determining synaptic updates using the efficient update framework may be generated. In one or more implementations, the code may comprise one or more programs capable of determining event dependent connection change (EDCC) components $b_m$.

Figure 7:
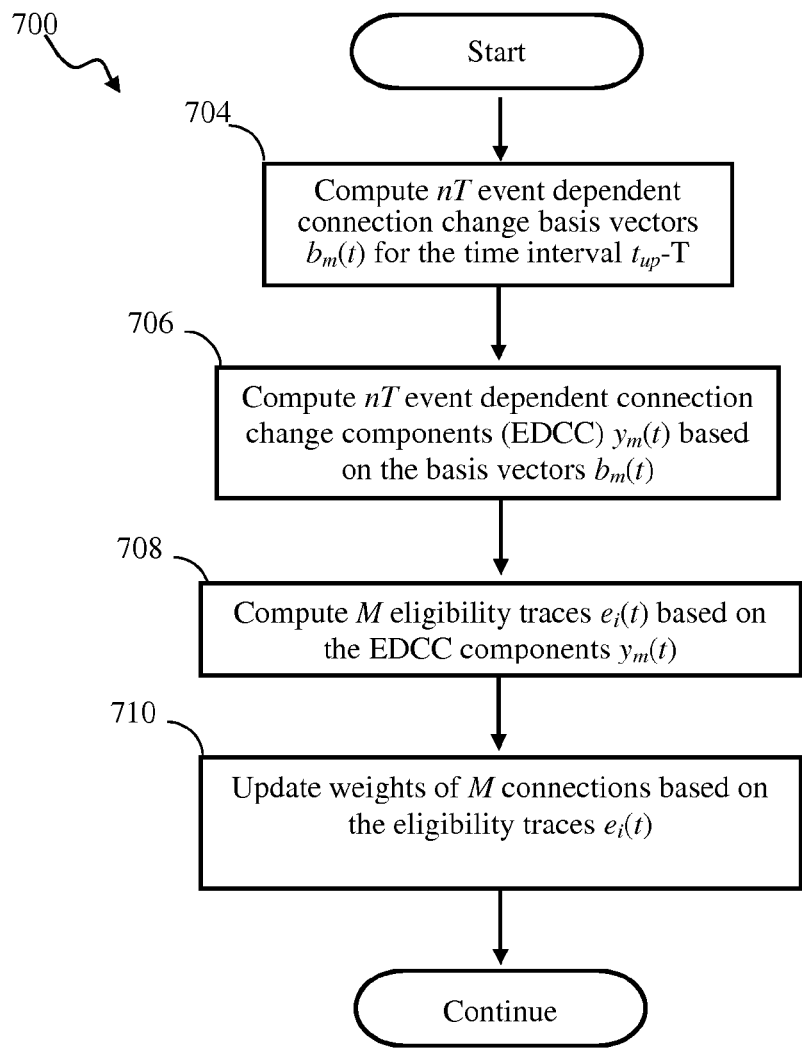
FIG. 7 is a logical flow diagram illustrating efficient update method, comprising time-dependent neuron dynamics, for use with neural network of FIG. 4, in accordance with one or more implementations.

In one or more implementations, at step 608 of method 600 the code configured at step 606 may be employed in order to perform synaptic updates during operation of the network in accordance with the efficient update framework, such as, for example, described with respect to FIG. 7, below.

At step 704 of method 700, a set of event-dependent connection change basis vectors $b_m(t)$ may be computed for the time interval $(t_{up}-T)$, as described above with respect to Eqn. 18, Eqn. 29, Eqn. 34.

At step 706 the EDCC components $y_m(t)$ may be computed by, for example, using the basis vectors $b_m(t)$ and Euler's integration method.

At step 708, the eligibility traces $e_{ij}(t)$ may be computed by, for example, using a linear combination of the EDCC components $y_m(t)$ as described, for example, in U.S. patent application Ser. No. 13/560,891 entitled "APPARATUS AND METHODS FOR EFFICIENT UPDATES IN SPIKING NEURON NETWORKS", filed Jul. 27, 2012, incorporated supra.

At step 710, the connection parameter $\theta_{ij}$ adjustment (e.g., plasticity update) may be computed using the eligibility traces and the performance function, as shown, for example, by Eqn. 25, Eqn. 35.

FIGS. 8A-8C provide an exemplary program listing capable of determining synaptic updates using efficient update framework based on event dependent connection change (EDCC) components, such as for example, the program code described with respect to method 600 above. The program listing of FIGS. 8A-8C may comprise, inter alia, one or more instructions configured to implement LUTs per neuron. It is noteworthy, the neuron implementation of FIGS. 8A-8C may comprise one or more synapses operable in accordance with event-based efficient update rules thereby advantageously alleviating the use an UPDATE_RULE that may be executed at individual time steps Δt of network operation.

Figure 9:
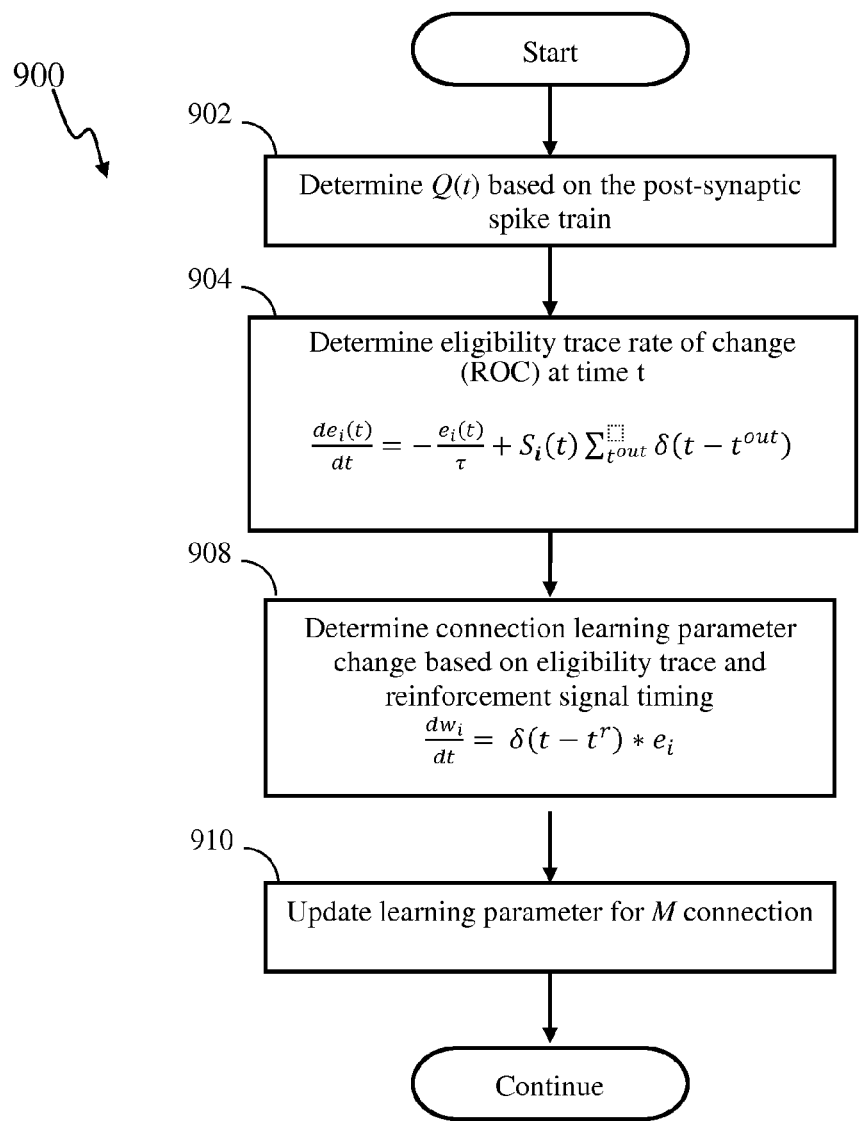
FIG. 9 is a logical flow diagram illustrating reinforcement modulated STDP update, for use with neural network of FIG. 4, in accordance with one or more implementations.

FIG. 9 illustrates one exemplary implementation of modulated STDP update in accordance with generalized update framework of the disclosure. The method 900 of FIG. 9 may allow users to effectuate reward-based plasticity updates when implementing reinforcement learning.

At step 902 of method 900, neuronal plasticity term Q(t) may be determined. In one or more implementations, the neuronal term Q(t) may be determined based on the tie history of neuron post-synaptic activity.

At step 904, rate of change of the eligibility trace for one or more (M) connections may be determined. In some implementations, the eligibility trace ROC may be determined in accordance with Eqn. 17.

At step 906, connection learning parameter modification may be determined based on the eligibility trace and reinforcement signal timing. In one or more implementations, the learning parameter change may be determined in accordance with Eqn. 19

At step 908 of method 900, learning parameters of M connections may be updated. In one or more implementations, immediate (on demand) and/or synchronized update may be effectuated, as described in detail in U.S. patent application Ser. No. 13/560,891 entitled "APPARATUS AND METHODS FOR EFFICIENT UPDATES IN SPIKING NEURON NETWORKS", filed Jul. 27, 2012, incorporated supra.

Exemplary Apparatus

Various exemplary spiking network apparatus comprising one or more of the methods set forth herein (e.g., using the efficient connection plasticity update mechanism explained above) are now described with respect to FIGS. 10-11D.

Adaptive Processing Apparatus

Figure 10:
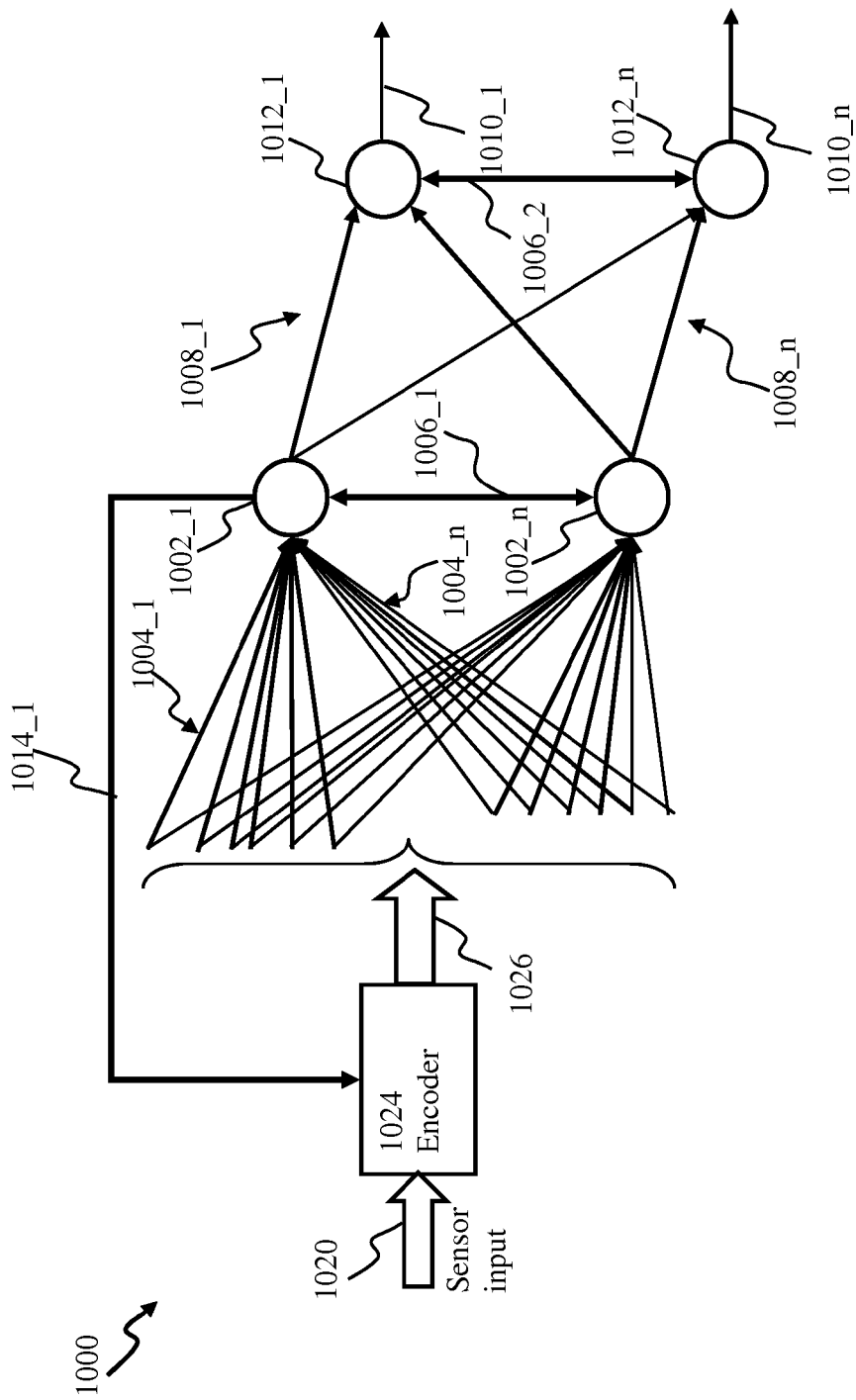
FIG. 10 is a block diagram illustrating sensory processing apparatus configured to implement efficient connection plasticity update mechanism in accordance with one or more implementations.

One apparatus for processing of sensory information (e.g., visual, audio, somatosensory) using spiking neural network comprising for example the efficient connection plasticity update mechanism is shown in FIG. 10. The illustrated processing apparatus 1000 may comprise an input interface configured to receive an input sensory signal 1020. In some implementations, this sensory input may comprise electromagnetic waves (e.g., visible light, IR, UV, etc.) entering an imaging sensor array (comprising RGCs, a charge coupled device (CCD), or an active-pixel sensor (APS)). The input signal in this case may be a sequence of images (image frames) received from a CCD camera via a receiver apparatus, or downloaded from a file. Alternatively, the image may be a two-dimensional matrix of RGB values refreshed at a 24 Hz frame rate. It will be appreciated by those skilled in the art that the above image parameters are merely exemplary, and many other image representations (e.g., bitmap, CMYK, grayscale, etc.) and/or frame rates are equally useful with the present invention.

The apparatus 1000 may comprise an encoder 1024 configured to transform (encodes) the input signal into an encoded signal 1026. In one variant, the encoded signal may comprise a plurality of pulses (also referred to as a group of pulses) configured to model neuron behavior. The encoded signal 1026 may be communicated from the encoder 1024 via multiple connections (also referred to as transmission channels, communication channels, or synaptic connections) 1004 to one or more neuronal nodes (also referred to as the detectors) 1002.

In the implementation of FIG. 10, different detectors of the same hierarchical layer may be denoted by a "_n" designator, such that e.g., the designator 1002_1 denotes the first detector of the layer 1002. Although only two detectors (1002_1, 1002_n) are shown in the embodiment of FIG. 10 for clarity, it is appreciated that the encoder can be coupled to any number of detector nodes that may be compatible with the detection apparatus hardware and software limitations. Furthermore, a single detector node may be coupled to any practical number of encoders.

In one embodiment, individual ones of the detectors 1002_1, 1002_n contain logic (which may be implemented as a software code, hardware logic, or a combination of thereof) configured to recognize a predetermined pattern of pulses in the encoded signal 1004, using for example any of the mechanisms described in U.S. patent application Ser. No. 12/869,573, filed Aug. 26, 2010 and entitled "SYSTEMS AND METHODS FOR INVARIANT PULSE LATENCY CODING", U.S. patent application Ser. No. 12/869,583, filed Aug. 26, 2010, entitled "INVARIANT PULSE LATENCY CODING SYSTEMS AND METHODS", U.S. patent application Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", [BRAIN.006A] U.S. patent application Ser. No. 13/152,084, filed Jun. 2, 2011, entitled "APPARATUS AND METHODS FOR PULSE-CODE INVARIANT OBJECT RECOGNITION", [client reference BRAIN.001A] each incorporated herein by reference in its entirety, to produce post-synaptic detection signals transmitted over communication channels 1008. In FIG. 10, the designators 1008_1, 1008_n denote output of the detectors 1002_1, 1002_n, respectively.

In one implementation, the detection signals may be delivered to a next layer of the detectors 1012 (comprising detectors 1012_1, 1012_m, 1012_k) for recognition of complex object features and objects, similar to the exemplary implementation described in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", [client reference BRAIN.001A] incorporated herein by reference in its entirety. In this implementation, individual subsequent layers of detectors may be configured to receive signals from the previous detector layer, and to detect more complex features and objects (as compared to the features detected by the preceding detector layer). For example, a bank of edge detectors may be followed by a bank of bar detectors, followed by a bank of corner detectors and so on, thereby enabling alphabet recognition by the apparatus.

Individual ones of the detectors 1002 may output detection (post-synaptic) signals on communication channels 1008_1, 1008_n (with appropriate latency) that may propagate with different conduction delays to the detectors 1012. The detector cascade of the embodiment of FIG. 10 may contain any practical number of detector nodes and detector banks determined, inter alia, by the software/hardware resources of the detection apparatus and complexity of the objects being detected.

The sensory processing apparatus implementation illustrated in FIG. 10 may comprise lateral connections 1006.

In some implementations, the apparatus 1000 may comprise feedback connections 1014, configured to communicate context information from detectors within one hierarchy layer to previous layers, as illustrated by the feedback connections 1014_1 in FIG. 10. In some implementations, the feedback connection 1014_2 may be configured to provide feedback to the encoder 1024 thereby facilitating sensory input encoding, as described in detail in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", [client reference BRAIN.001A] incorporated supra.

Computerized Neuromorphic System

Figure 11A:
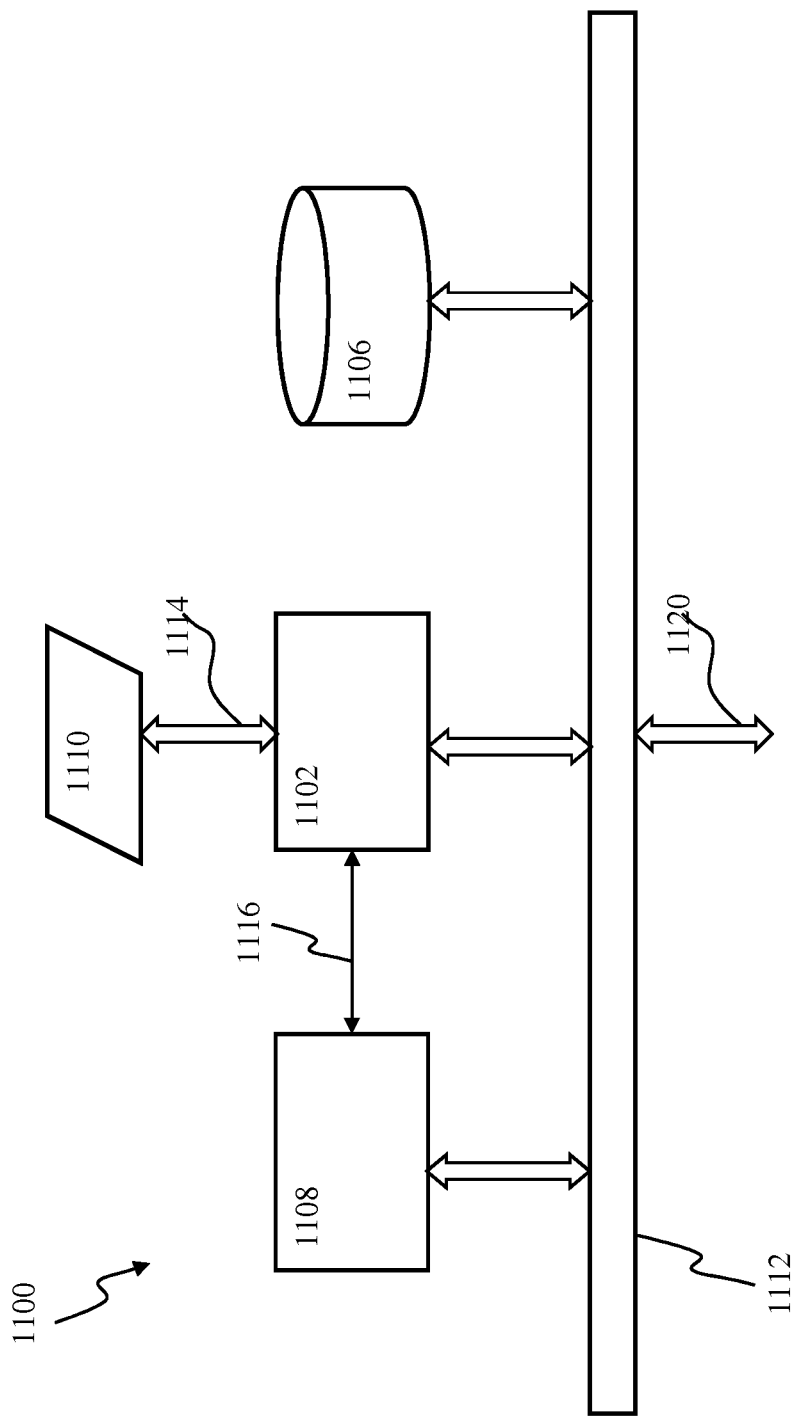
FIG. 11A is a block diagram illustrating computerized system useful for efficient connection plasticity update mechanism in a spiking network, in accordance with one or more implementations.

One particular implementation of the computerized neuromorphic processing system, for operating a computerized spiking network (and implementing the exemplary efficient connection plasticity update methodology described supra), is illustrated in FIG. 11A. The computerized system 1100 of FIG. 11A may comprise an input interface 1110, such as for example an image sensor, a computerized spiking retina, an audio array, a touch-sensitive input device, etc. The input interface 1110 may be coupled to the processing block (e.g., a single or multi-processor block) via the input communication interface 1114. The system 1100 may comprise a random access memory (RAM) 1108, configured to store neuronal states and connection parameters (e.g., weights 526 in FIG. 5), and to facilitate synaptic updates. In some implementations, synaptic updates may be performed according to the description provided in, for example, in U.S. patent application Ser. No. 13/239,255 filed Sep. 21, 2011, entitled "APPARATUS AND METHODS FOR SYNAPTIC UPDATE IN A PULSE-CODED NETWORK", [client reference BRAIN.008A] incorporated by reference supra.

In some implementations, the memory 1108 may be coupled to the processor 1102 via a direct connection (memory bus) 1116. The memory 1108 may also be coupled to the processor 1102 via a high-speed processor bus 1112).

The system 1100 may comprise a nonvolatile storage device 1106, comprising, inter alia, computer readable instructions configured to implement various aspects of spiking neuronal network operation (e.g., sensory input encoding, connection plasticity, operation model of neurons, etc.). in one or more implementations, the nonvolatile storage 1106 may be used to store state information of the neurons and connections when, for example, saving/loading network state snapshot, or implementing context switching (e.g., saving current network configuration (comprising, inter alia, connection weights and update rules, neuronal states and learning rules, etc.) for later use and loading previously stored network configuration.

In some implementations, the computerized apparatus 1100 may be coupled to one or more external processing/storage/input devices via an I/O interface 1120, such as a computer I/O bus (PCI-E), wired (e.g., Ethernet) or wireless (e.g., Wi-Fi) network connection.

In another variant, the input/output interface may comprise a speech input (e.g., a microphone) and a speech recognition module configured to receive and recognize user commands.

It will be appreciated by those skilled in the arts that various processing devices may be used with computerized system 1100, including but not limited to, a single core/multicore CPU, DSP, FPGA, GPU, ASIC, combinations thereof, and/or other processors. Various user input/output interfaces may be similarly applicable to embodiments of the invention including, for example, an LCD/LED monitor, touch-screen input and display device, speech input device, stylus, light pen, trackball, end the likes.

Figure 11B:
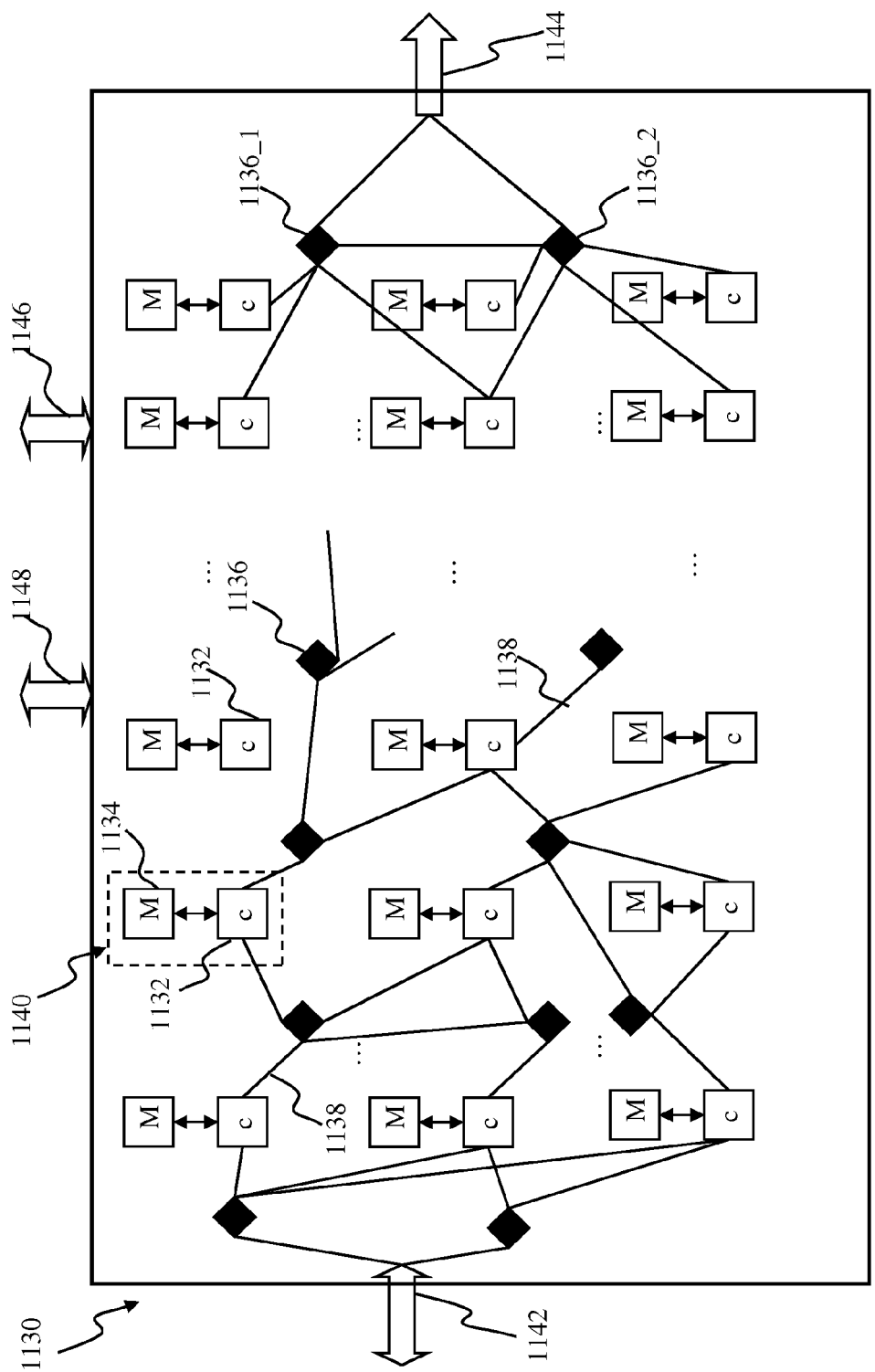
FIG. 11B is a block diagram illustrating a neuromorphic computerized system useful with efficient connection plasticity update mechanism in a spiking network, in accordance with one or more implementations.

Referring now to FIG. 11B, one implementation of neuromorphic computerized system configured to implement efficient connection plasticity update mechanism in a spiking network is described in detail. The neuromorphic processing system 1130 of FIG. 11B may comprise a plurality of processing blocks (micro-blocks) 1140 where individual micro cores may comprise a computing logic core 1132 and a memory block 1134. The logic core 1132 may be configured to implement various aspects of neuronal node operation, such as the node model, and synaptic update rules (e.g., the I-STDP) and/or other tasks relevant to network operation. The memory block may be configured to store, inter alia, neuronal state variables and connection parameters (e.g., weights, delays, I/O mapping) of connections 1138.

The micro-blocks 1140 may be interconnected with one another using connections 1138 and routers 1136. As it is appreciated by those skilled in the arts, the connection layout in FIG. 11B is exemplary, and many other connection implementations (e.g., one to all, all to all, etc.) may be compatible with the disclosure.

The neuromorphic apparatus 1130 may be configured to receive input (e.g., visual input) via the interface 1142. In one or more implementations, applicable for example to interfacing with computerized spiking retina, or image array, the apparatus 1130 may provide feedback information via the interface 1142 to facilitate encoding of the input signal.

The neuromorphic apparatus 1130 may be configured to provide output (e.g., an indication of recognized object or a feature, or a motor command, e.g., to zoom/pan the image array) via the interface 1144.

The apparatus 1130, in one or more implementations, may interface to external fast response memory (e.g., RAM) via high bandwidth memory interface 1148, thereby enabling storage of intermediate network operational parameters (e.g., spike timing, etc.). The apparatus 1130 may also interface to external slower memory (e.g., Flash, or magnetic (hard drive)) via lower bandwidth memory interface 1146, in order to facilitate program loading, operational mode changes, and retargeting, where network node and connection information for a current task may be saved for future use and flushed, and previously stored network configuration may be loaded in its place.

Figure 11C:
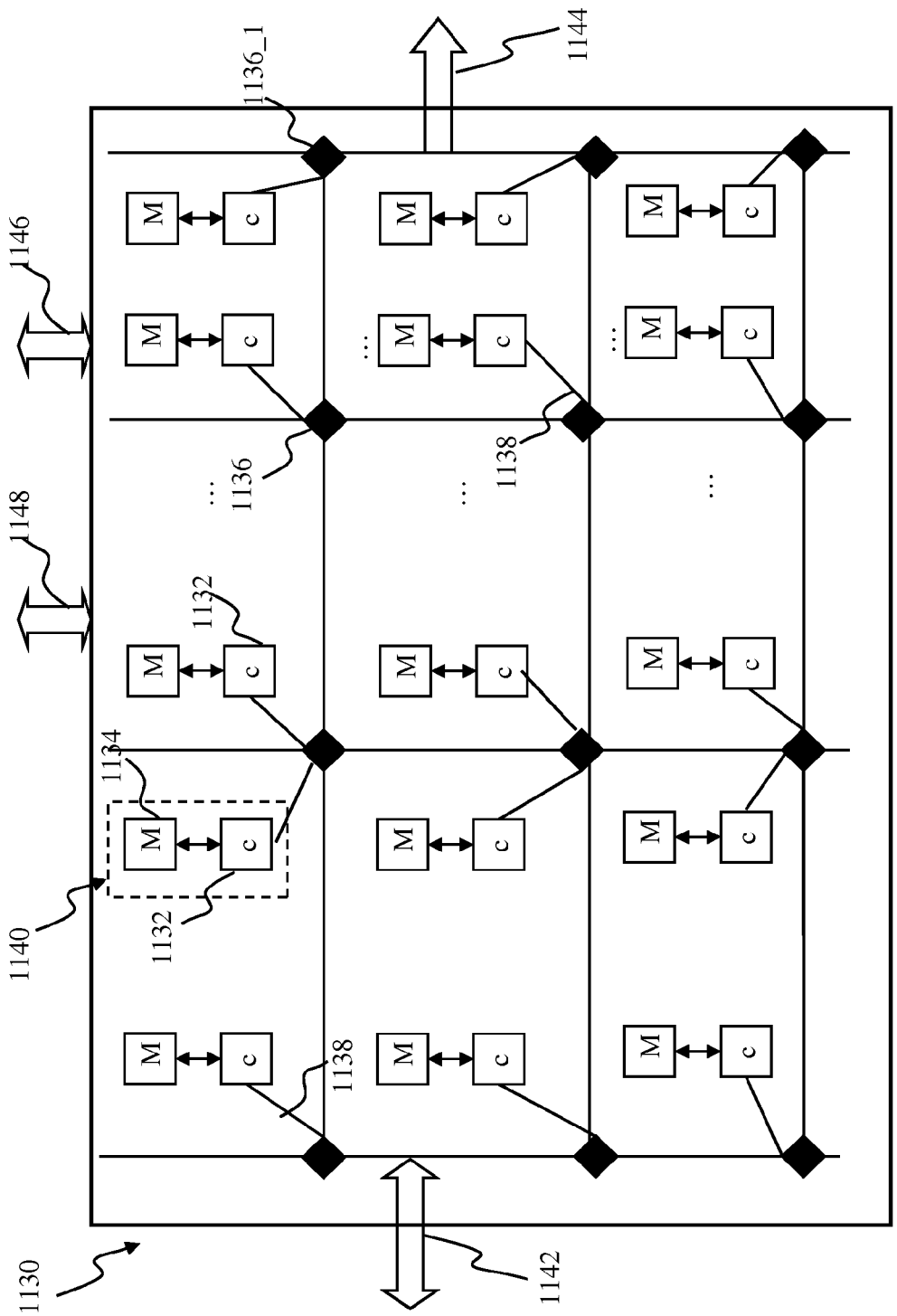
FIG. 11C is a block diagram illustrating a hierarchical neuromorphic computerized system architecture useful with efficient connection plasticity update mechanism in a spiking network, in accordance with one or more implementations.

FIG. 11C, illustrates one or more implementation of shared bus neuromorphic computerized system comprising microblocks, described with respect to FIG. 11B, supra. architecture coupled to a shared) 1140. The apparatus 1145 of FIG. 11C utilized one o (or more) shared bus 1146 in order to interconnect micro-blocks 1140 with one another.

Figure 11D:
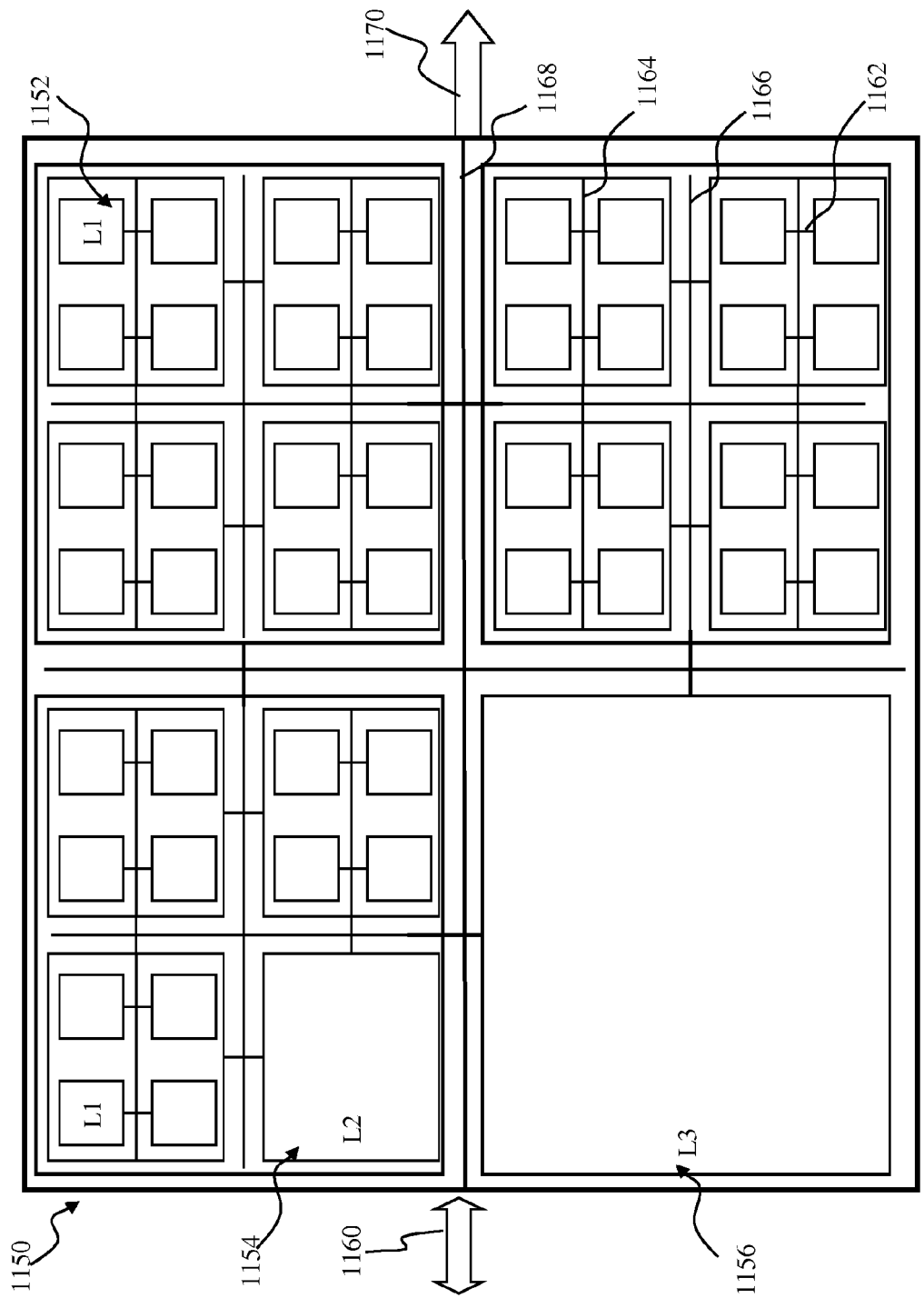
FIG. 11D is a block diagram illustrating cell-type neuromorphic computerized system architecture useful with efficient connection plasticity update mechanism in a spiking network, in accordance with one or more implementations.

FIG. 11D, illustrates one implementation of cell-based neuromorphic computerized system architecture configured to implement efficient connection plasticity update mechanism in a spiking network is described in detail. The neuromorphic system 1150 of FIG. may comprise a hierarchy of processing blocks (cells block). In some implementations, the lowest level L1 cell 1152 of the apparatus 1150 may comprise logic and memory and may be configured similar to the micro block 1140 of the apparatus shown in FIG. 11B. A number of cell blocks may be arranges in a cluster and communicate with one another a local interconnects 1162, 1164. Individual ones of such clusters may form higher level cell, e.g., cell L2, denoted as 1154 in FIG. 11*d*. Similarly several L2 clusters may communicate with one another via a second level interconnect 1166 and form a super-cluster L3, denoted as 1156 in FIG. 11D. The super-clusters 1154 may communicate via a third level interconnect 1168 and may form a next level cluster, and so on. It will be appreciated by those skilled in the arts that the hierarchical structure of the apparatus 1150, comprising four cells-per-level, is merely one exemplary implementation, and other implementations may comprise more or fewer cells per level, and/or fewer or more levels.

Different cell levels (e.g., L1, L2, L3) of the apparatus 1150 may be configured to perform functionality various levels of complexity. In one implementation, different L1 cells may process in parallel different portions of the visual input (e.g., encode different frame macro-blocks), with the L2, L3 cells performing progressively higher level functionality (e.g., edge detection, object detection). Different L2, L3, cells may also perform different aspects of operating, for example, a robot, with one or more L2/L3 cells processing visual data from a camera, and other L2/L3 cells operating motor control block for implementing lens motion what tracking an object or performing lens stabilization functions.

The neuromorphic apparatus 1150 may receive input (e.g., visual input) via the interface 1160. In one or more implementations, applicable for example to interfacing with computerized spiking retina, or image array, the apparatus 1150 may provide feedback information via the interface 1160 to facilitate encoding of the input signal.

The neuromorphic apparatus 1150 may provide output (e.g., an indication of recognized object or a feature, or a motor command, e.g., to zoom/pan the image array) via the interface 1170. In some implementations, the apparatus 1150 may perform all of the I/O functionality using single I/O block (not shown).

The apparatus 1150, in one or more implementations, may interface to external fast response memory (e.g., RAM) via high bandwidth memory interface (not shown), thereby enabling storage of intermediate network operational parameters (e.g., spike timing, etc.). In one or more implementations, the apparatus 1150 may also interface to external slower memory (e.g., flash, or magnetic (hard drive)) via lower bandwidth memory interface (not shown), in order to facilitate program loading, operational mode changes, and retargeting, where network node and connection information for a current task may be saved for future use and flushed, and previously stored network configuration may be loaded in its place.

Exemplary Uses and Applications of Certain Aspects of the Invention

Advantageously, the methodology described herein may provide generalized framework for implementing state-dependent learning in spiking neuron networks. In some implementations, learning parameter adjustment for a connection may be configured based on the eligibility trace associated with the connection. The eligibility trace time evolution may be expressed based on neuron-specific term and connection specific term. Accordingly, implementation specific program code may be 'plugged-in' into the generalized framework thereby enabling seamless implementation of a wide range of plasticity rules.

Efficient update methodology may advantageously be traded for (i) reduction in cost, complexity, size and power consumption of a neuromorphic apparatus that may be required to operate the network; and/or (ii) increase apparatus throughput thereby allowing for networks of higher synapse density. The use of efficient neuron network update framework, may reduce neuron network development costs by enabling the users to rely on the framework to implement updates efficiently, thereby alleviating additional coding efforts.

In one or more implementations, the generalized state-dependent learning methodology of the disclosure may be implemented as a software library configured to be executed by a computerized neural network apparatus (e.g., containing a digital processor). In some implementations, the generalized learning apparatus may comprise a specialized hardware module (e.g., an embedded processor or controller). In some implementations, the spiking network apparatus may be implemented in a specialized or general purpose integrated circuit (e.g., ASIC, FPGA, and/or PLD). Myriad other implementations may exist that will be recognized by those of ordinary skill given the present disclosure.

Advantageously, the present disclosure can be used to simplify and improve control tasks for a wide assortment of control applications including, without limitation, industrial control, adaptive signal processing, navigation, and robotics. Exemplary implementations of the present disclosure may be useful in a variety of devices including without limitation prosthetic devices (such as artificial limbs), industrial control, autonomous and robotic apparatus, HVAC, and other electromechanical devices requiring accurate stabilization, set-point control, trajectory tracking functionality or other types of control. Examples of such robotic devices may include manufacturing robots (e.g., automotive), military devices, and medical devices (e.g., for surgical robots). Examples of autonomous navigation may include rovers (e.g., for extraterrestrial, underwater, hazardous exploration environment), unmanned air vehicles, underwater vehicles, smart appliances (e.g., ROOMBA®), and/or robotic toys. The present disclosure can advantageously be used in all other applications of adaptive signal processing systems (comprising for example, artificial neural networks), including: machine vision, pattern detection and pattern recognition, object classification, signal filtering, data segmentation, data compression, data mining, optimization and scheduling, and/or complex mapping.

It will be recognized that while certain aspects of the disclosure are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the invention. This description is in no way meant to be limiting, but rather should be taken as illustrative of the general principles of the invention. The scope of the disclosure should be determined with reference to the claims.

What is claimed:

1. A computer-implemented method of implementing learning in a computerized spiking neuron, the method being performed by one or more processors configured to execute computer program modules, the method comprising:
   operating the neuron in accordance with a learning process configured to be updated at one or more time intervals, the learning process update comprising:
      retrieving prior values of first and second traces associated, respectively, with first and second connections that are capable of providing spiking input into the neuron;
      determining a rate of change of:
         (i) the first trace based on (1) the prior value of the first trace and (2) a product of a neuron portion and a first connection portion; and
         (ii) the second trace based on (1) the prior value of the second trace and (2) a product of the neuron portion and a second connection portion; and
      determining an updated value of the first and second traces based on the respective rate of change;
   wherein:
      the prior values of the first and the second traces are associated with another update preceding the update,
      the first connection portion and the second connection portion are based on one or more spikes of a spiking input being provided, respectively, via the first and the second connections, the one or more spikes occurring within a time interval between the another update and the update; and
      the learning process is capable of causing the neuron to generate an output in accordance with the spiking input, the output being characterized by a performance measure configured such that the update is capable of reducing the measure.

2. A computer-implemented method of operating a plurality of data interfaces in a computerized network comprising at least a node, the method being performed by one or more processors configured to execute computer program modules, the method comprising:
   storing a time record of one or more data items capable of being provided to the node via the plurality of data interfaces, the time record comprising information associated with individual ones of the one or more data items occurring at an interval prior to present time;
   determining a value of a plurality of eligibility traces, based on the time record;
   determining a rate of change of a respective trace of the plurality of eligibility traces, based on (i) a present value of the plurality of eligibility traces; and (ii) a product of a node component and a plurality of interface components; and
   effectuating an update of individual ones of the plurality of interfaces based on the rate of change;
   wherein:
      the respective trace of the plurality of eligibility traces is associated with a respective interface of the plurality of interfaces;
      the individual ones of the plurality of interface components are configured to characterize the respective trace; and
      the node component is configured based on a node state, the node state being common to the plurality of interfaces; and
      the update is configured to transition a present instance of the node state towards a target state, the target state being associated with the node generating an output consistent with the one more data items.

3. The method of claim 2, wherein:
   individual ones of the plurality of interface components are configured to characterize a state of individual ones of the plurality of interfaces independently from one another; and
   the node component is configured to characterize the present instance of the node state for individual ones of the plurality of interfaces simultaneously to one another.

4. The method of claim 2, wherein:
   individual ones of the plurality of interfaces are characterized by individual ones of a plurality of synaptic weights; and
   the update comprises modifying individual ones of the plurality of synaptic weights based on an updated eligibility trace.

5. The method of claim 4, wherein: the updated eligibility trace is determined via an integration of the rate of change with respect to time.

6. The method of claim 4, wherein:
   the modifying individual ones of the weights is determined based on a product of the rate of change and an additional signal, the additional signal being time dependent and configured to affect individual ones of the plurality of interfaces; and
   the rate of change for at least one of the weights is capable of being determined independently from other of the weights.

7. The method of claim 6, wherein the additional signal comprises a reinforcement signal conveying information associated with at least one reinforcement spike, the reinforcement signal being configured based on the node state and the target state.

8. The method of claim 7, wherein the update is based on an event comprising one or more of:
   (i) generation of the output comprising at least one spike;
   (ii) occurrence of the one or more spikes;
   (iii) a timer event indicative of an expiration of a current update time period; or
   (iv) the at least one reinforcement spike.

9. The method of claim 7, wherein the reinforcement signal is configured based on a distance measure between the output and a target output, the target output being associated with the target state.

10. The method of claim 9, wherein the distance measure comprises one or more of: (i) mean squared error, (ii) weighed error; or (iii) squared error.

11. The method of claim 7, wherein the reinforcement signal is capable of providing:
   a positive reward when a distance measure between the present instance of the node state and the target state is smaller compared to a distance measure between a prior node state and the target state; and
   a negative reward when the distance measure between the present instance of the node state and the target state is greater compared to the distance measure between the prior state and the target state.

12. The method of claim 6, wherein: the additional signal is configured based on a performance measure determined based on a present performance associated with the present instance of the node state, and a target performance associated with the target state.

13. The method of claim 7, wherein the output is characterized by a spike-free time period subsequent to an occurrence of the least one reinforcement spike.

14. The method of claim 12, wherein the additional signal comprises a negative reward determined based on the present performance being outside a predetermined measure from the target performance.

15. The method of claim 2, wherein:
individual ones of the plurality of eligibility traces are configured based on an analytic solution of a time derivative representation, the time derivative representation configured to characterize the time record; and
the determination of the value of the plurality of eligibility traces comprises integration of the time derivative representation via symbolic integration operation.

16. The method of claim 2, wherein:
the node is capable of being operated in accordance with a dynamic process configured to be updated at time intervals; and
the time interval comprises a plurality of the time intervals.

17. The method of claim 1, wherein:
the update further comprises a synaptic update of efficacy of the first connection and efficacy of the second connection;
efficacy of the first connection configured to affect contribution to state of the spiking neuron due to a portion of the spiking input provided to the neuron via the first connection; and
efficacy of the second connection configured to affect contribution to the state of the spiking neuron due to a portion of the spiking input provided to the neuron via the second connection.

18. The method of claim 17, wherein:
the first connection portion is configured to characterize a first connection and the second connection portion is configured to characterize a second connection; and
the update comprises a modification of efficacy of the first connection and efficacy of the second connection, efficacy modification being configured based on the first trace and the second trace, respectively.

19. The method of claim 18, wherein the efficacy modification of the first and second connections is configured based on a product of the first or the second trace, respectively, and a reinforcement signal comprising at least one reinforcement spike, the reinforcement signal being configured based on present state and a target state of the neuron.

20. The method of claim 18, wherein:
the spiking input is provided during a stimulus interval;
the update comprises a plasticity rule configured to modify a magnitude of the efficacy of the first connection and the efficacy of the second connection efficacy, the modifying of the magnitude having a time window associated therewith; and
the plasticity rule is configured to adjust at least one of (1) a start point of the window and (2) an end point of the window.

21. The method of claim 18, wherein:
the first connection efficacy comprises a first connection weight;
the second connection efficacy comprises a second connection weight;
the first connection weight configured to perform a weighted linear combination on a first portion of the spiking input provided to the neuron via the first connection; and
the second connection weight configured to perform a weighted linear combination on a second portion of the spiking input provided to the neuron via the second connection.

22. The method of claim 21, wherein:
the spiking input is provided during a stimulus interval; and
the update comprises a plasticity rule configured to modify a magnitude of the first connection weight and a magnitude of the second connection weight, the plasticity rule being characterized by a portion of the plasticity rule having a time scale configured substantially comparable to the stimulus interval.

23. The method of claim 22, wherein the plasticity rule is characterized by another portion of the plasticity rule configured to exceed the stimulus interval by at least 10 times.

24. The method of claim 22, wherein the output comprises at least one spike generated by the neuron based on the spiking input.

25. A system configured to operate a plurality of data interface means in a computerized network comprising at least a node means, the system comprising:
a means for storing a time record of one or more data items capable of being provided to the node means via the plurality of data interface means, the time record comprising information associated with individual ones of the one or more data items occurring at an interval prior to present time;
a means for determining a value of a plurality of eligibility trace means, based on the time record;
a means for determining a rate of change of a respective trace means of the plurality of eligibility trace means, based on (i) a present value of the plurality of eligibility trace means; and (ii) a product of a node component means and a plurality of interface component means; and
a means for effectuating an update of individual ones of the plurality of interface means based on the rate of change;
wherein:
the respective trace means of the plurality of eligibility trace means is associated with a respective interface means of the plurality of interface means;
the individual ones of the plurality of interface component means are configured to characterize the respective trace means; and
the node component means is configured based on a node state, the node state being common to the plurality of interface means; and
the update is configured to transition a present instance of the node state towards a target state, the target state being associated with the node means generating an output consistent with the one more data items.

* * * * *